US010677257B2

United States Patent
Armand et al.

(10) Patent No.: US 10,677,257 B2
(45) Date of Patent: Jun. 9, 2020

(54) TURBOCHARGER COMPRESSOR WHEEL ASSEMBLY

(71) Applicant: Garrett Transportation I Inc., Torrance, CA (US)

(72) Inventors: Dominique Armand, Uxegney (FR); Joel Castan, Chantraine (FR); Bernard Remy, Thaon les Vosges (FR); Jean-Luc Perrin, Girmont (FR); Frederic Daguin, Epinal (FR)

(73) Assignee: Garrett Transportation I Inc., Torrance, CA (US)

( * ) Notice: Subject to any disclaimer, the term of this patent is extended or adjusted under 35 U.S.C. 154(b) by 275 days.

(21) Appl. No.: 15/715,117

(22) Filed: Sep. 25, 2017

(65) Prior Publication Data

US 2018/0017068 A1    Jan. 18, 2018

Related U.S. Application Data

(63) Continuation-in-part of application No. 15/081,736, filed on Mar. 25, 2016, and a continuation-in-part of
(Continued)

(51) Int. Cl.
*F04D 29/26* (2006.01)
*F04D 29/28* (2006.01)
(Continued)

(52) U.S. Cl.
CPC .......... *F04D 29/266* (2013.01); *F01D 5/025* (2013.01); *F02C 6/12* (2013.01); *F04D 29/023* (2013.01);
(Continued)

(58) Field of Classification Search
CPC ...... F04D 29/054; F04D 17/10; F04D 29/284; F04D 29/056; F04D 29/266;
(Continued)

(56) References Cited

U.S. PATENT DOCUMENTS

| 3,091,982 A | 6/1963 | Siebol |
| 4,254,809 A | 3/1981 | Schuster |

(Continued)

FOREIGN PATENT DOCUMENTS

| DE | 10 2009 021725 A1 | 11/2010 |
| DE | 10 2015 106638 A1 | 1/2016 |

(Continued)

OTHER PUBLICATIONS

EP Application No. 17156795.1-1610, Extended European Search Report, dated Sep. 19, 2017 (8 pages).
(Continued)

*Primary Examiner* — Eldon T Brockman
(74) *Attorney, Agent, or Firm* — Brian J. Pangrle

(57) ABSTRACT

A method of loading a rotating assembly of a turbocharger includes positioning a lock collar on an end portion of a turbocharger shaft that extends through a through bore of a compressor wheel; applying a pulling force to the end portion of the turbocharger shaft to achieve a desired amount of loading; welding the lock collar to form a welded lock collar fixed to the end portion of the turbocharger shaft; and releasing the pulling force where the welded lock collar maintains the desired amount of loading.

19 Claims, 18 Drawing Sheets

Related U.S. Application Data application No. 15/081,718, filed on Mar. 25, 2016, now Pat. No. 10,233,936.

(51) Int. Cl.

| | |
|---|---|
| *F02C 6/12* | (2006.01) |
| *F01D 5/02* | (2006.01) |
| *F16B 19/05* | (2006.01) |
| *F16D 1/072* | (2006.01) |
| *F16D 1/076* | (2006.01) |
| *F04D 29/02* | (2006.01) |
| *F04D 29/20* | (2006.01) |

(52) U.S. Cl.
CPC .......... *F04D 29/20* (2013.01); *F04D 29/284* (2013.01); *F16B 19/05* (2013.01); *F16D 1/072* (2013.01); *F16D 1/076* (2013.01); *F01D 5/027* (2013.01); *F05B 2220/40* (2013.01); *F05D 2220/40* (2013.01); *F05D 2230/232* (2013.01)

(58) Field of Classification Search
CPC ........ F04D 29/023; F04D 29/20; F16B 19/05; F16D 1/076; F16D 1/072; F01D 5/025; F01D 5/027; F05D 2220/40; F05D 2230/232; F02C 6/12; F05B 2220/40

See application file for complete search history.

(56) References Cited

U.S. PATENT DOCUMENTS

| | | | |
|---|---|---|---|
| 4,299,519 A | 11/1981 | Corbett | |
| 4,813,834 A | 3/1989 | Smith | |
| 6,516,510 B1 | 2/2003 | Fulbright | |
| 9,879,693 B2 * | 1/2018 | Boening | ............... F04D 29/266 |
| 2012/0011969 A1 | 1/2012 | Katou et al. | |
| 2013/0115088 A1 | 5/2013 | Castan et al. | |
| 2013/0202382 A1 | 8/2013 | Corebett | |
| 2015/0267712 A1 * | 9/2015 | Boening | ............... F04D 29/403 |
| | | | 415/213.1 |

FOREIGN PATENT DOCUMENTS

| | | |
|---|---|---|
| DE | 10 2015 216319 A1 | 3/2017 |
| EP | 0 615 480 B1 | 11/1995 |
| EP | 2 592 280 A2 | 5/2013 |
| EP | 2 876 276 A1 | 5/2015 |
| EP | 2 592 280 A3 | 11/2017 |
| GB | 858882 A | 1/1961 |
| WO | 1987000891 A1 | 2/1987 |
| WO | 2001/11248 A1 | 2/2001 |
| WO | 2002/23056 A1 | 3/2002 |
| WO | 2010/111133 A2 | 9/2010 |
| WO | 2010/111133 A3 | 1/2011 |
| WO | 2014041328 A1 | 3/2014 |
| WO | 2015033330 A1 | 3/2015 |
| WO | 2015/168063 A1 | 11/2015 |

OTHER PUBLICATIONS

EP Application No. 17156794.4-1610, Extended European Search Report, dated Sep. 19, 2017 (8 pages).
MAGNI, MAGNI 565 Fastener Coating Product Data Sheet, Nov. 2015 (1 page).
Alcoa, C50L Huckbolt, 2012 (8 pages).
Alcoa, Huck Bobtail System, 2009 (9 pages).
EP Application No. 18196152.5-1007, Extended European Search Report, dated Jan. 30, 2019 (5 pages).

* cited by examiner

TURBOCHARGER COMPRESSOR WHEEL ASSEMBLY

RELATED APPLICATIONS

This application is a continuation-in-part of a U.S. patent application having Ser. No. 15/081,718, filed 25 Mar. 2016, which is incorporated by reference herein, and this application is also a continuation-in-part of a U.S. patent application having Ser. No. 15/081,736, filed 25 Mar. 2016, which is incorporated by reference herein.

TECHNICAL FIELD

Subject matter disclosed herein relates generally to compressor wheel assemblies for turbochargers for internal combustion engines.

BACKGROUND

Exhaust driven turbochargers include a rotating group that includes a turbine wheel and a compressor wheel that are connected to one another by a shaft. The shaft is typically rotatably supported within a center housing by one or more bearings (e.g., oil lubricated, air bearings, ball bearings, magnetic bearings, etc.). During operation, exhaust from an internal combustion engine drives a turbochargers turbine wheel, which, in turn, drives the compressor wheel to boost charge air to the internal combustion engine.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
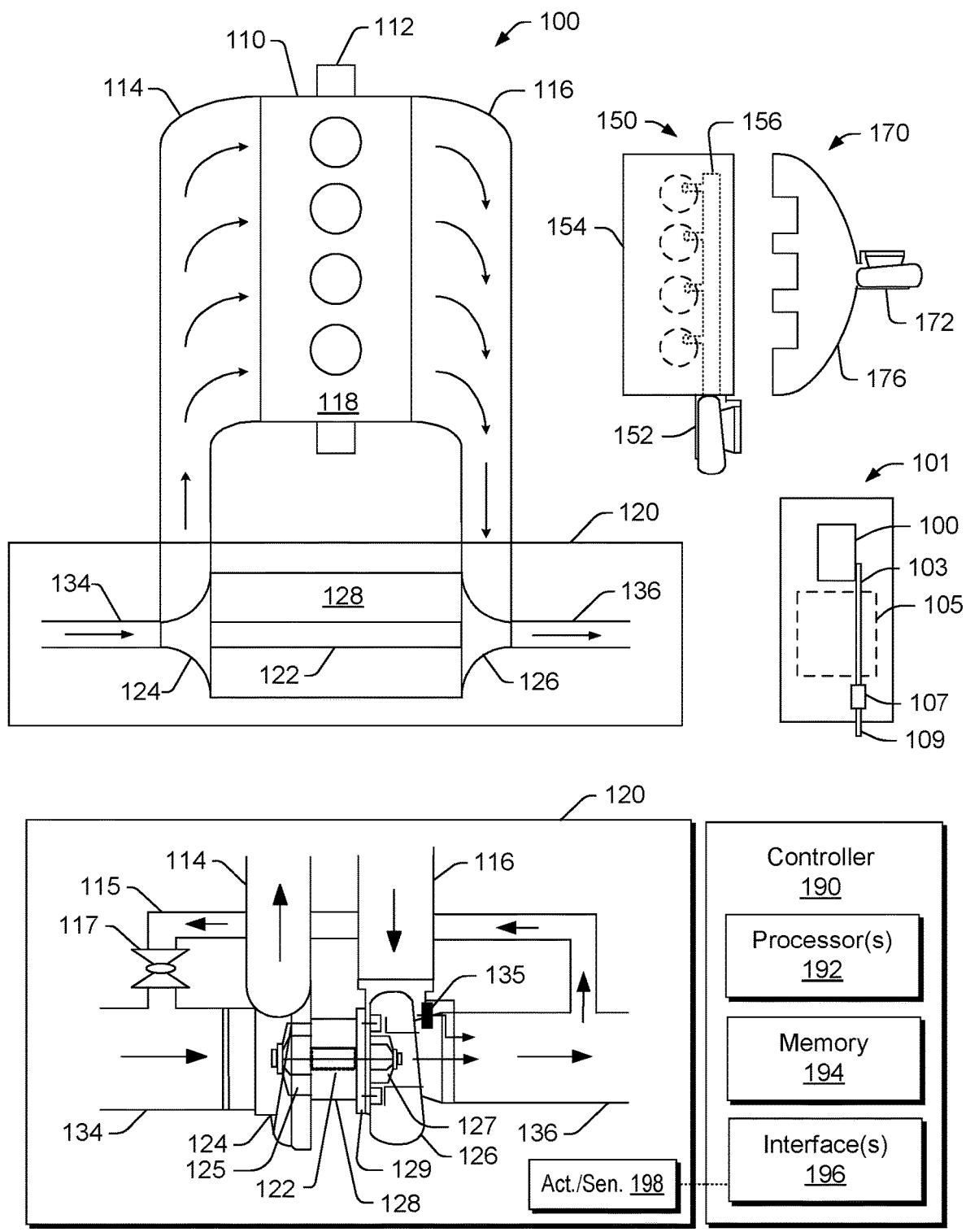
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 fora turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
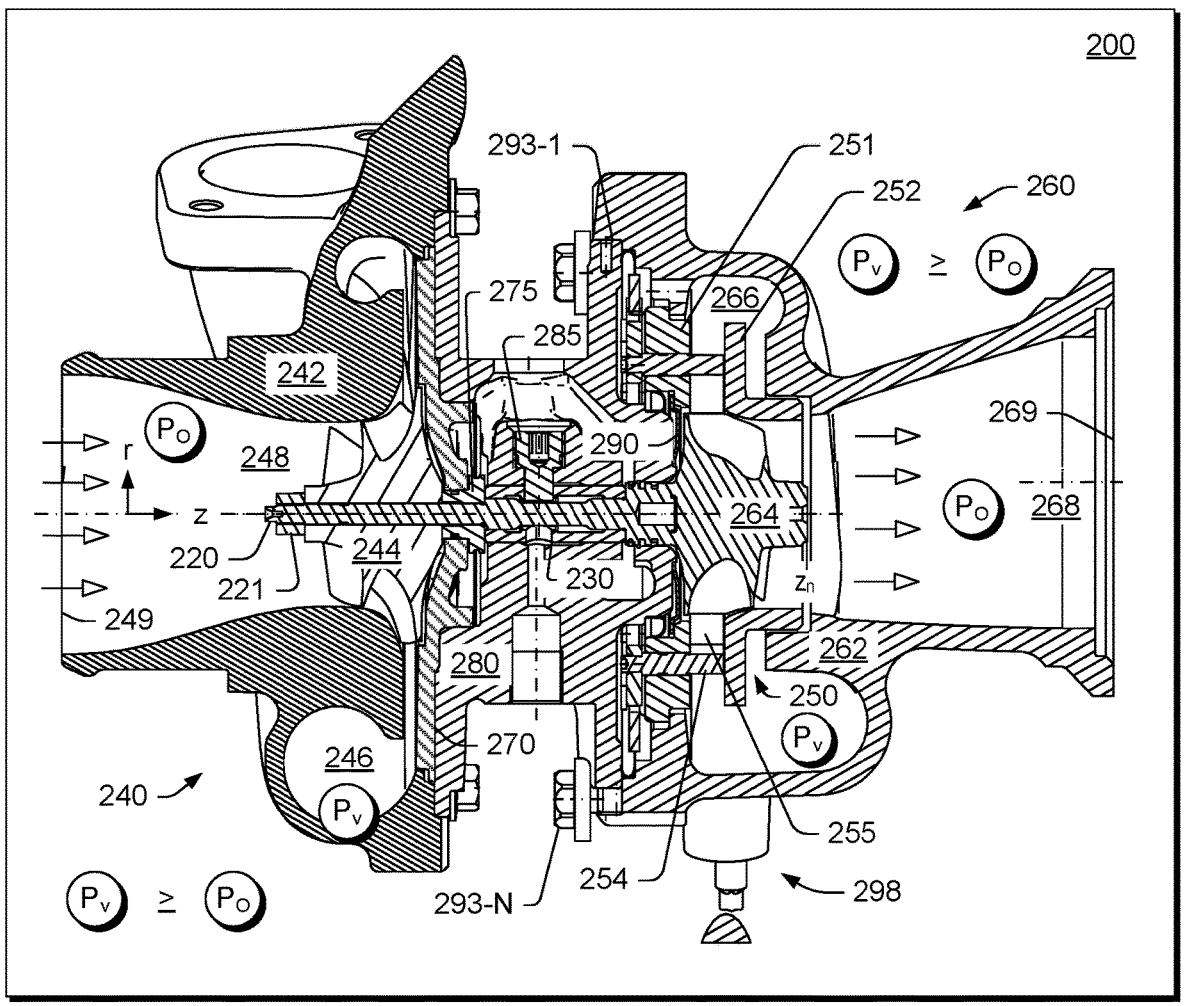
FIG. 2 is a cutaway view of an example of a turbocharger assembly.

FIG. 2 shows an example of a turbocharger assembly 200 that includes a shaft 220 supported by a bearing 230 (e.g., a journal bearing, a bearing assembly such as a rolling element bearing with an outer race, etc.) disposed in a bore (e.g., a through bore defined by one or more bore walls) of a housing 280 between a compressor assembly 240 and a turbine assembly 260. The compressor assembly 240 includes a compressor housing 242 that defines a volute 246 and that houses a compressor wheel 244. As shown in FIG. 2, the turbine assembly 260 includes a turbine housing 262 that defines a volute 266 and that houses a turbine wheel 264. The turbine wheel 264 may be, for example, welded or otherwise attached to the shaft 220 to form a shaft and wheel assembly (SWA) where a free end of the shaft 220 allows for attachment of the compressor wheel 244.

As to air flow, air can be directed to the volute 246 via a diffuser section defined in part by the compressor housing 242 and a backplate 270 as the compressor wheel 244 rotates, drawing air into a passage 248 via an inlet 249, both of which may be defined by the compressor housing 242. As indicated in FIG. 2, during operation of the turbocharger 200, the compressor wheel 244 acts to boost air pressure such that air pressure in the volute 246 ($P_V$) is greater than air pressure in the passage 248 ($P_O$). As an example, where exhaust gas recirculation (EGR) is implemented, environmental air may be mixed with exhaust (e.g., upstream and/or downstream of the compressor wheel 244).

In the example of FIG. 2, an axial locating pin 285 is received in an opening of the bearing 230, which may be a cross-bore of the bearing 230. As an example, where the bearing 230 is a rolling element bearing with an outer race, the outer race can include an opening. As an example, one or more other types of axial locating mechanisms may be included in a turbocharger that act to limit axial movement of a bearing (e.g., and/or movement in one or more other directions).

In the example of FIG. 2, the shaft 220 includes a step (e.g., a shoulder) that forms an axial annular face. In the example of FIG. 2, a thrust collar 275 includes a surface that is seated against the axial annular face of the shaft 220. In such an example, a lock nut 221 can include threads that match threads of an end portion of the shaft 220 such that tightening of the lock nut 221 with respect to the shaft 220 loads the compressor wheel 244 and the thrust collar 275 against the axial annular face of the shaft 220, which can place the shaft 220 (e.g., from the step to its end portion) in tension. In such an example, the shaft 220, the compressor wheel 244 and the lock nut 221 can rotate as a unit (e.g., responsive to exhaust driving the turbine wheel 264). As shown in the example of FIG. 2, the backplate 270 can include a bore in which at least a portion of the thrust collar 275 is positioned where the thrust collar 275 can include a groove or grooves that may seat a seal element or seal elements (e.g., O-rings, piston rings, etc.).

The turbine assembly 260 further includes a variable geometry assembly 250, which may be referred to as a "cartridge" (e.g., the cartridge 250), that may be positioned using an annular component or flange 251 (e.g., optionally shaped as a stepped annular disc) of the cartridge 250 that clamps between the housing 280 and the turbine housing 262, for example, using bolts 293-1 to 293-N and a heat shield 290 (e.g., optionally shaped as a stepped annular disc), the latter of which is disposed between the cartridge 250 and the housing 280. As shown in the example of FIG. 2, the cartridge 250 includes a shroud component 252 and the annular component 251. As an example, one or more mounts or spacers 254 may be disposed between the shroud component 252 and the annular component 251, for example, to axially space the shroud component 252 and the annular component 251 (e.g., forming a nozzle space).

As an example, vanes 255 may be positioned between the shroud component 252 and the annular component 251, for example, where a control mechanism may cause pivoting of the vanes 255. As an example, the vane 255 may include a vane post that extends axially to operatively couple to a control mechanism, for example, for pivoting of the vane 255 about a pivot axis defined by the vane post.

As to exhaust flow, higher pressure exhaust in the volute 266 passes through passages (e.g., a nozzle or nozzles, a throat or throats, etc.) of the cartridge 250 to reach the turbine wheel 264 as disposed in a turbine wheel space defined by the cartridge 250 and the turbine housing 262. After passing through the turbine wheel space, exhaust travels axially outwardly along a passage 268 defined by a wall of the turbine housing 262 that also defines an opening 269 (e.g., an exhaust outlet). As indicated, during operation of the turbocharger 200, exhaust pressure in the volute 266 ($P_V$) is greater than exhaust pressure in the passage 268 ($P_O$).

As an example, wheel, whether a turbine wheel or a compressor wheel, can include an inducer portion and an exducer portion, for example, characterized in part by an inducer radius ($r_i$) and an exducer radius ($r_e$). As an example, an individual blade can include an inducer edge (e.g., a leading edge) and an exducer edge (e.g., a trailing edge). A wheel may be defined in part by a trim value that characterizes a relationship between inducer and exducer portions.

A turbocharger rotor-bearing system transmits turbine wheel energy to a compressor wheel, which generally aims to do so with minimum induced effect. Examples of bearing systems designs and technologies include hydrodynamic bearing technology, ball bearing technology, and oil less bearing technology, among others.

A hydrodynamic rotor-bearing system integrates various components and assemblies such as a shaft (e.g., a shaft and turbine wheel assembly or SWA), a journal bearing assembly, a thrust bearing assembly, compressor side seals, turbine side seals, and a center housing. A hydrodynamic rotor-bearing system may be a center housing rotating assembly (CHRA). Dynamic behavior of such a CHRA tends to be quite nonlinear. Such behavior can be associated with vibrations, noises, fluid losses, mechanical losses, etc.

A rotor-bearing system operates under extreme conditions. For a relatively low viscosity oil (e.g., 0W30 or 0W20 oil) at approximately 150 degrees C., the viscosity of the oil is close to the viscosity of water. For a passenger vehicle, a maximum speed rating for a turbocharger can be higher than 300,000 rpm. Such a turbocharger may have a journal diameter of approximately 6 mm.

During operation, a rotor-bearing system may experience various types of motion, which may include synchronous motion (e.g., synchronous orbit(s)) and subsynchronous motion (e.g., subsynchronous orbit(s)); noting that supersynchronous motion may exist. Analyses of operational systems can demonstrate various types of motion, which may be characterized via factors such as displacement from a central rotational axis (e.g., of the order of microns or less), frequencies (e.g., frequency versus speed as in a Campbell diagram), magnitude (e.g., magnitude versus frequency), etc. Analyses may reveal various modes such as, for example, one or more of a flexural mode, a cylindrical mode, and a conical mode.

A Campbell diagram represents a system's response spectrum as a function of its oscillation regime. In rotordynamical systems, the eigenfrequencies often depend on rotation rates due to induced gyroscopic effects or variable hydrodynamic conditions in fluid bearings. An analysis of a rotordynamical system can include computing values of eigenfrequencies as a function of a shaft's rotation speed, which can provide for output of a whirl speed map (e.g., a plot of damped natural frequencies versus shaft rotational speeds).

A turbocharger may be expected to be quality controlled for maximum tolerances, particularly as to a bearing system to help assure rotordynamic stability beyond a maximum rated turbocharger operating speed. Turbocharger compressor and turbine wheels may be quality controlled as to blade frequencies (e.g., compressor and turbine blade natural frequencies). A blade may be quality controlled to withstand potentially damaging vibrations. A turbocharger may be quality controlled as to shaft critical speed(s), to help assure that destructive shaft critical speeds are well out of a turbocharger's operating range. As an example, a larger wheel may be paired with a larger shaft diameter to help avoid a shaft bending critical speed.

As an example, a balancing process may be performed at "low" speed or "high" speed. Various commercially available balancing machines (e.g., "vibration sort rig" (VSR) machines) are configured for high speed balancing of turbocharger cores (e.g., cartridges, RBSs or center housing rotating assemblies (CHRAs)). A typical VSR machine-based balancing process supplies lubricant and drives a rotor using compressed air. Such balancing requires various manual steps, including noting heavy point(s) and manual cutting. Depending on the amount of unbalance, a person may need to repeat such steps, which adds cost. Various low speed balancing machines allow for two-plane balancing and can achieve acceptable results; noting that many high speed balancing machines only allow for single plane balancing. In either instance, low speed or high speed, balancing aims to provide for proper operation, noise reduction and longevity of a turbocharger.

More and more stringent and accurate compressor wheel assembling techniques can help to insure robustness with respect to vehicle conditions. As an example, consider utilization of one or more techniques that can help to control and reduce assembling unbalance of a CHRA, which may otherwise lead to one or more detrimental behaviors (e.g., motions, orbits, etc.).

As an example, a method can include utilizing various cylindrical parts for compressor wheel assembling (e.g., fitting a compressor wheel to a shaft, which can be a shaft of a CHRA).

As an example, a method can include utilizing a thread-less lock nut (e.g., a lock collar) and a thread-less shaft. Such an approach can help to insure better lock nut, stub shaft (e.g., and compressor wheel and thrust spacer) alignment with respect to a shaft's rotation axis. Such an approach can allow for use of mating surfaces that may more accurately meet specifications when compared to a threaded surface.

As an example, a method may simplify manufacture and/or assembly (e.g., to increase through-put, allow time for focus on other aspects of manufacture, allow time for focus on other aspects of assembly, etc.).

As an example, a method may allow for a more accurate process for compressor wheel tightening on a shaft when compared to a torque and angle or/and stretch control approach.

As an example, a method may be help to reduce risk of deformation during assembly, which can help to achieve a concentric bushing assembly with respect to a rotation axis, which can help to minimize unbalance.

Figure 3:
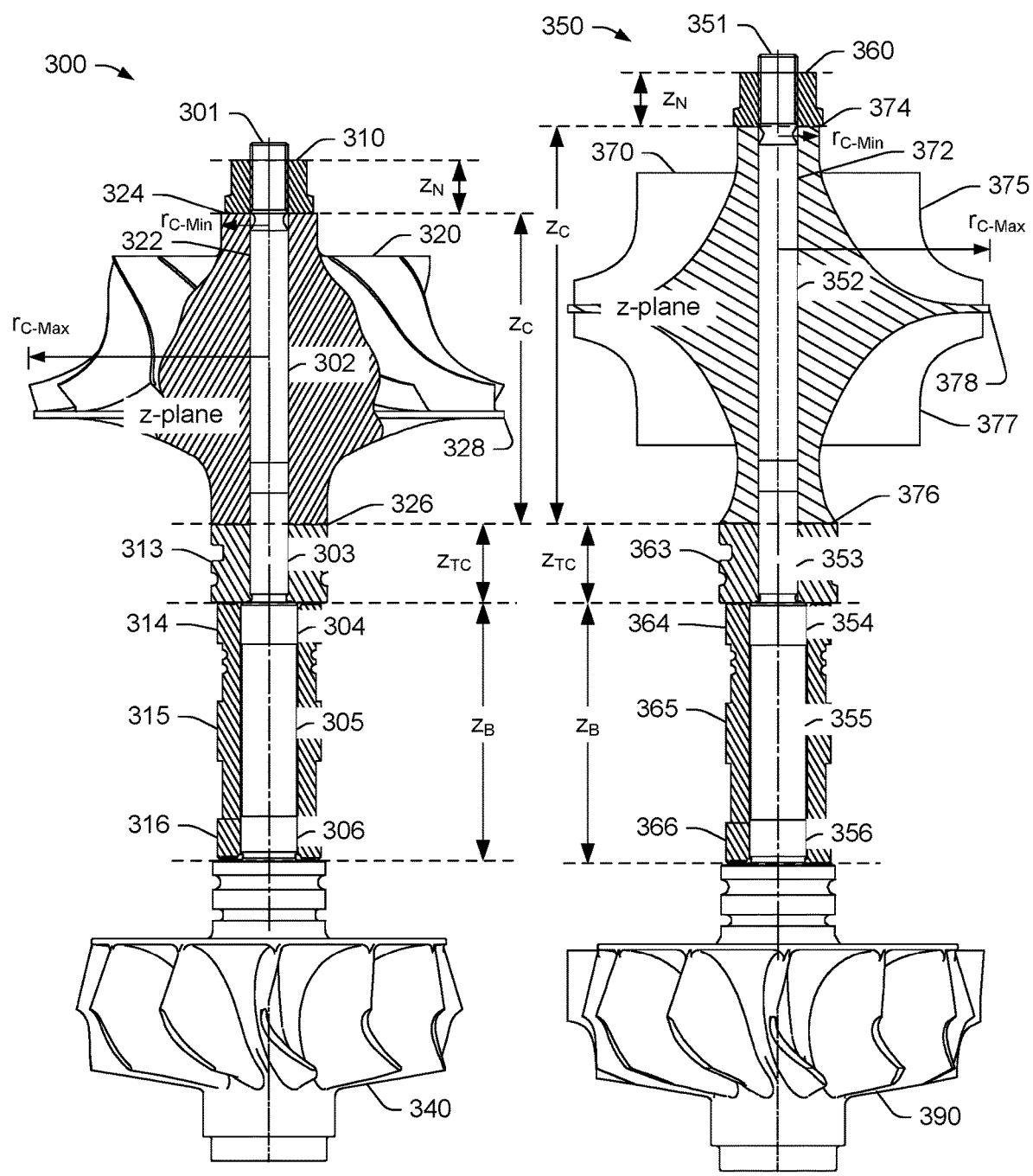
FIG. 3 is a diagram of two examples of compressor wheel assemblies.

FIG. 3 shows examples of two assemblies 300 and 350 where each of the assemblies includes a compressor wheel 320 or 370 having a through bore 322 or 372 and a lock nut 310 or 360 fixed to a shaft 301 or 351 that extends through the through bore 322 or 372. As shown, the compressor wheel 370 includes two impeller faces 375 and 377 (e.g., outwardly and inwardly facing) while the compressor wheel 320 includes only a single impeller face (e.g., outwardly facing; noting that a single impeller face may be inwardly facing).

In the examples of FIG. 3, each of the shafts 301 and 351 extends from a respective turbine wheel 360 and 390. Disposed axially along each of the shafts 301 and 351 are respective thrust collars 313 and 363 and respective bearings 315 and 365. The shaft 301 includes a compressor wheel portion 302, a thrust collar portion 303, a compressor journal bearing portion 304, a bearing portion 305, and a turbine journal bearing portion 306. The shaft 351 also includes a compressor wheel portion 352, a thrust collar portion 353, a compressor journal bearing portion 354, a bearing portion 355, and a turbine journal bearing portion 356. Various axial dimensions are shown for the bearings 315 and 365 ($z_B$), the thrust collars 313 and 363 ($z_B$), the compressor wheels 320 and 370 ($z_C$), and the lock nuts 310 and 360 ($Z_N$).

For the assembly 300, the compressor wheel 320 includes a nose end 324 that abuts the lock nut 310 and a base end 326 that abuts the thrust collar 313. The compressor wheel 320 has a minimum radius $r_{C-Min}$ at its nose end 324 and has a maximum wheel radius $r_{C-Max}$ at an edge 328 that coincides with a so-called z-plane.

For the assembly 350, the compressor wheel 370 includes a nose end 374 that abuts the lock nut 360 and a base end 376 that abuts the thrust collar 363. The compressor wheel 370 has a minimum radius $r_{C-Min}$ at its nose end 374 and has a maximum wheel radius $r_{C-Max}$ at an edge 378 that coincides with a so-called z-plane.

In the assemblies 300 and 350, the respective shafts 301 and 351 each include a shoulder (e.g., a step) that is located at a transition between the bearing and the thrust collar portions. As shown, the thrust collar 313 can seat against the shoulder of the shaft 301 and the thrust collar 363 can seat against the shoulder of the shaft 351. As an example, a shaft shoulder can include an annular surface that can be in contact with an annular surface of a thrust collar. As an example, a thrust collar can include an annular surface that contacts a base end of a compressor wheel. As an example, a thrust collar can be "clamped" (e.g., via tightening of a lock nut) in an axial location that is between a surface of a shaft and a surface of a compressor wheel such that the compressor wheel, the thrust collar and the shaft rotate as a unit. In such an example, a bearing may be positioned with an axial clearance between the thrust collar and an end of the bearing and the bearing may be positioned with an axial clearance between a surface of a turbine wheel and an opposing end of the bearing. As mentioned, a bearing may be axially located where axial movement of the bearing is limited.

With respect to balancing, as an example, a lock nut may be made of steel and be suitable for measuring unbalance through magnetic field sensing. During a balancing process, one or more cuts may be made in a lock nut according to information provided by a balancing machine (e.g., a vibration sort rig, etc.). As an example, a lock collar may be made of steel and be suitable for measuring unbalance through magnetic field sensing. During a balancing process, one or more cuts may be made in a lock collar according to information provided by a balancing machine (e.g., a vibration sort rig, etc.).

Figure 4:
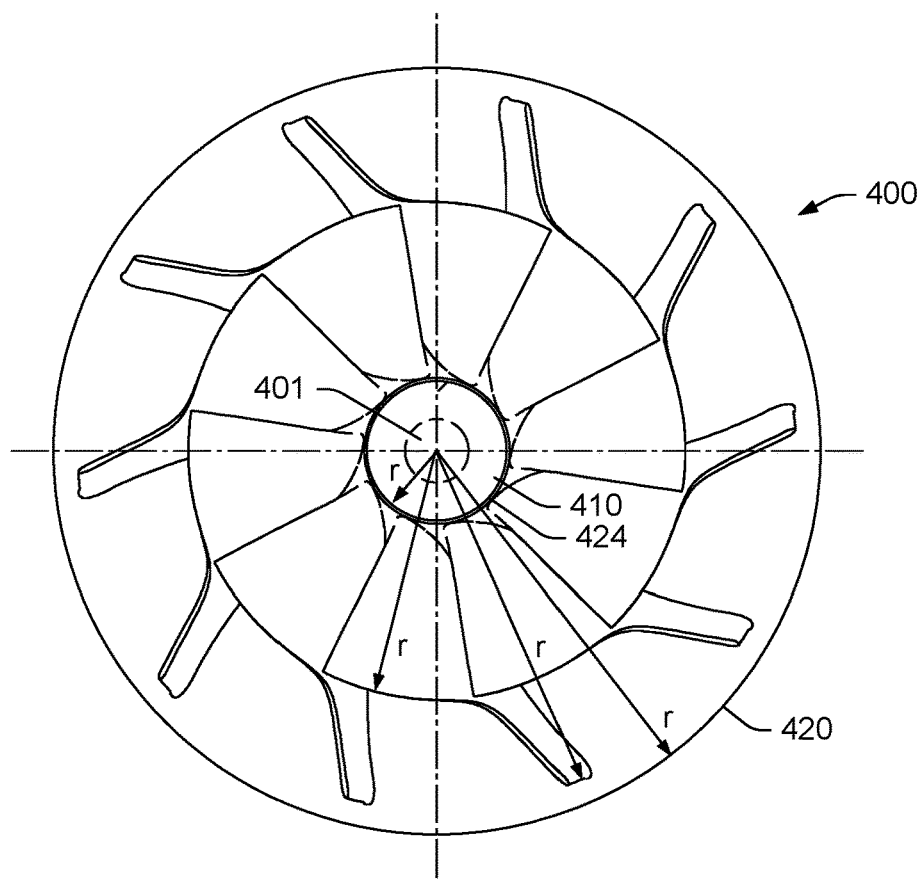
FIG. 4 is a diagram of an example of a compressor wheel assembly.
Figure 4:
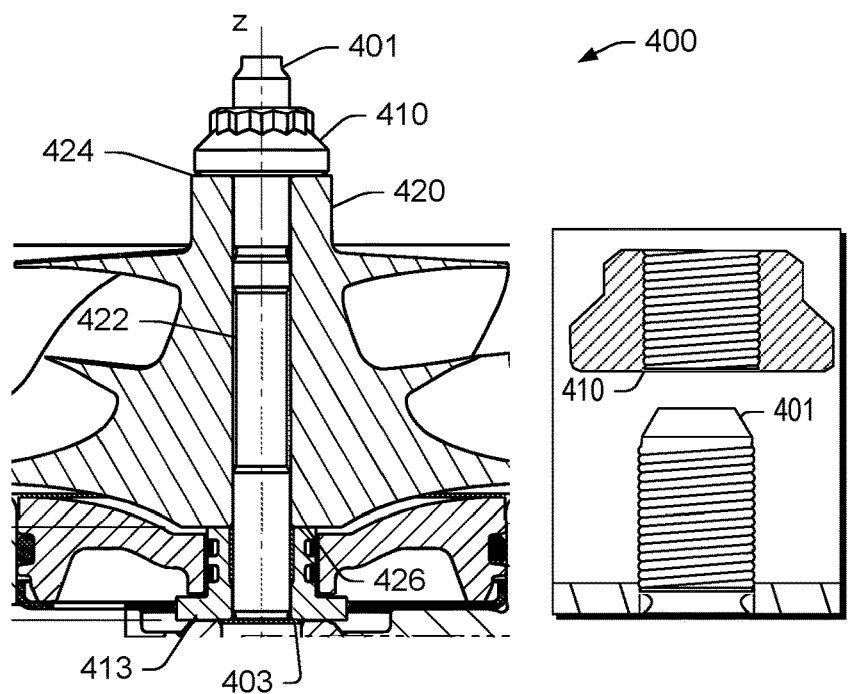

FIG. 4 shows an example of an assembly 400 that includes a shaft 401, a lock nut 410, a thrust collar 413, and a compressor wheel 420 where the shaft 401 extends through a bore 422 of the compressor wheel 420, where the lock nut 410 abuts a nose end 424 of the compressor wheel 420 and where the thrust collar 413 abuts a base end 426 of the compressor wheel 420. In such an example, the lock nut 410 can include internal threads that mate with external threads of the shaft 401 such that the lock nut 410 can contact the nose end 424 of the compressor wheel 420 to retain the compressor wheel 420 on the shaft 401. For example, the lock nut 410 can be rotated such that matching spiral threads cause the lock nut 410 to translate axially responsive to rotation.

As shown in an enlarged view of FIG. 4, the lock nut 410 includes internal threads and the shaft 401 includes external threads where the threads are mating threads such that rotation of the lock nut 410 without rotation of the shaft 401 causes the lock nut 410 to translate axially with respect to the shaft 401 (e.g., the threads are defined by a pitch such that a number of degrees of rotation causes a corresponding movement in an axial direction).

As an example, an assembly process can be referred to as clamping. For example, the lock nut 410 can clamp the compressor wheel 420 in a manner where the compressor wheel 420 is under compression and where the shaft 401 is under tension. In the example of FIG. 4, the thrust collar 413 can be seated against a surface 403 of the shaft 401 (e.g., a shoulder) such that tightening of the lock nut 410 acts to apply compressive force on the compressor wheel 420 and the thrust collar 413. In such an example, the shaft 401 can be at least in part under tension (e.g., from an axial position of the surface 403 to an axial position of the lock nut 410). As an example, during operation, thermal energy and kinetic energy can cause changes in forces.

Various material properties can characterize how an assembly may respond to thermal energy, rotation, compression, tension, etc. For example, thermal coefficients can determine how much a material expands or contracts in response to a change in temperature. As another example, the Poisson ratio can characterize dimensional changes that can occur in response to compression or tension. A US Patent Application Publication having Pub. No. US 2013/0115088 A1 is incorporated herein by reference, which is assigned to Honeywell International Inc. ('088 Publication). The '088 Publication describes various phenomena associated with use of a nut to secure a compressor wheel to a shaft, with reference to materials such as steel, aluminum and titanium. For example, a shaft may be made of steel (e.g., stainless or other steel) and a compressor wheel may be made of aluminum (e.g., aluminum or aluminum alloy). Such materials respond differently to load due to their material properties and such material can respond differently to temperature.

During periods of use and nonuse, a shaft and a compressor wheel of a turbocharger are exposed to various temperatures, which may cause the shaft and the compressor wheel, as well as other components, to expand or contract. Where the components are made of different materials, their individual linear coefficients of thermal expansion may differ, which can result in alteration of loads (e.g., forces), clearances, etc. Linear coefficients of thermal expansion may differ considerably, for example, stainless steel (316) is about $16 \times 10^{-6}$ m/mK, aluminum is about $22 \times 10^{-6}$ m/mK and titanium is about $9 \times 10^{-6}$ m/mK. Thus, for a one degree change in temperature (C or K), aluminum will expand linearly more than stainless steel, which will expand linearly more than titanium.

Where a component experiences strain in one direction, strain in another direction may be characterized by Poisson's ratio of the material from which the component is made. For example, where a component is compressed in one direction, it may expand in another direction and, similarly, where a component is tensioned in one direction, it may contract in another direction. Poisson's ratio may be formally defined as the ratio of transverse strain (perpendicular to the applied load) to axial strain (in the direction of the applied load). For isotropic stainless steel, Poisson's ratio is about 0.30 to 0.31; for an isotropic aluminum alloy, it tends to be slightly higher, about 0.33. For isotropic titanium, Poisson's ratio is about 0.34. Some materials can have a negative Poisson's ratio.

For components of a turbocharger assembly, an understanding of strain stems from an understanding of stress. The relationship between stress and strain of an elastic material may be characterized by the material's Young's modulus, which may be defines as the ratio of uniaxial stress over uniaxial strain over a range of stress for which Hooke's law applies (e.g., reversible strain). In solid mechanics, the slope of the stress-strain curve at any point is the tangent modulus and the initial, linear portion of a strain-strain curve is the Young's modulus (or tensile modulus or modulus of elasticity). Young's modulus depends on temperature, where for a temperature of about 200 C, steel is about $27 \times 10^6$ psi, titanium is about $14 \times 10^6$ psi and aluminum is about $9 \times 10^6$ psi.

During periods of operation, rotating components experience considerable centripetal force, which may be determined by mass, radius of the mass and angular velocity. Mass may be determined using density and volume of a material, for example, where the density of stainless steel is about 8,000 kg/m$^3$, aluminum is about 2,700 kg/m$^3$ and titanium is about 4,500 kg/m$^3$. Given a centripetal force (e.g., stress), an amount of radial strain may be predicted using Young's modulus. In turn, using Poisson's ratio, an amount of axial strain may be predicted. Where Poisson's ratio is positive (e.g., steel, aluminum, titanium, etc.), the axial strain will be negative. For example, an aluminum alloy compressor wheel spinning at 100,000 rpm will expand radially and contract axially.

The Poisson ratio is a negative ratio of transverse to axial strain. For example, where a material is compressed in one direction of a three-dimensional coordinate system, it can expand in other directions (e.g., perpendicular to a direction of compression), a phenomenon referred to as the Poisson effect. The Poisson ratio is a fraction (or percent) of expansion divided by a fraction (or percent) of compression, for small values of these changes. Conversely, if a material is stretched rather than compressed, it can contract in one or more directions transverse to a direction of stretching (e.g., an effect that may also be referred to as the Poisson effect). In such a scenario, the Poisson ratio is the ratio of relative contraction to relative expansion. In certain cases, a material may shrink in a transverse direction when compressed (or expand when stretched) which will yield a negative value of the Poisson ratio.

In the example of FIG. 4, the assembly 400 corresponds to a process used for through bore compressor wheel clamping where the lock nut 410 is tightened on a threaded shaft 401. Such a process can generate a substantial amount of variability in clamping load and can be accompanied by a substantial amount of unbalance. Variability in clamping load leads to min and max specifications for the tightening that can constrain design and performance. Unbalance attributed to clamping can originate from a lock nut itself, for example, as not being centered on a shaft (e.g., where threads do not locate radially) and, for example, from tightening, which can generate torsion and bending of a shaft.

Figure 5:
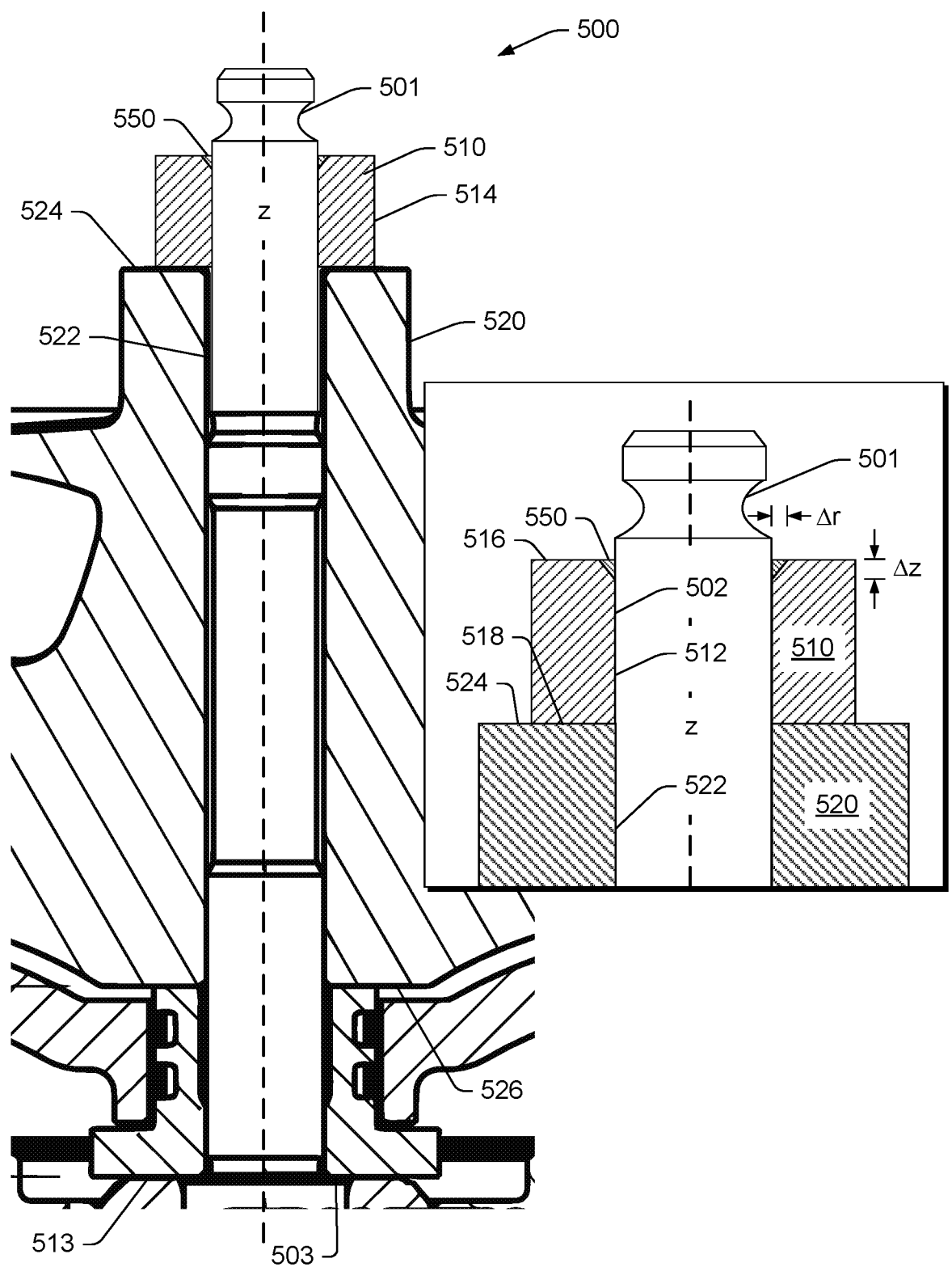
FIG. 5 is a diagram of an example of a compressor wheel assembly.

FIG. 5 shows an example of an assembly 500 that includes a shaft 501, a lock collar 510, a thrust collar 513, and a compressor wheel 520 where the shaft 501 extends through a bore 522 of the compressor wheel 520, where the lock collar 510 abuts a nose end 524 of the compressor wheel 520 and where the thrust collar 513 abuts a base end 526 of the compressor wheel 520.

In the example of FIG. 5, the assembly 500 includes a weld 550 that fixes the shaft 501 to the lock collar 510. As shown in an enlarged view in FIG. 5, the weld 550 can be defined in part by a radial dimension (e.g. $\Delta r$) and an axial dimension (e.g., $\Delta z$). The weld 550 can be formed by creation of a weld pool that solidifies. For example, energy deposited by an energy beam (e.g., a laser, etc.) can cause material of at least the lock collar 510 to melt to form a weld pool that upon solidification fixes the shaft 501 to the lock collar 510. Such fixation can be at an axial position that is determined at a time of assembly (e.g., at a time of welding to form the weld 550).

In the example of FIG. 5, the lock collar 510 includes an inner surface 512 that defines a bore of the lock collar 510 and a longitudinal bore axis (e.g., $z_{B-Lc}$). In such an example, the inner surface 512 can be cylindrical and defined, for example, by coordinates in a cylindrical coordinate system (e.g., r, z and $\Theta$). The inner surface 512 can be of a constant diameter over at least a portion of an axial length of the lock collar 510.

In the example of FIG. 5, the lock collar 510 includes an outer surface 514. In such an example, the outer surface 514 may be cylindrical and defined, for example, by coordinates in a cylindrical coordinate system (e.g., r, z and $\Theta$). The outer surface 514 may be, in a given state, axisymmetric such that the lock collar 510 is balanced with respect to its mass about the longitudinal axis of the bore of the lock collar 510. As an example, a portion of the lock collar 510 may be removed during a balancing operation to balance a rotating assembly (e.g., a CHRA).

In the example of FIG. 5, the shaft 501 includes an outer surface 502. In such an example, the outer surface 502 can be cylindrical and defined, for example, by coordinates in a cylindrical coordinate system (e.g., r, z and $\Theta$). The outer surface 502 can be of a constant diameter over at least a portion of an axial length of the shaft 501.

As shown in the example of FIG. 5, the bore of the lock collar 510 can receive the shaft 501 such that a portion of the shaft 501 may extend at least partially axially into the bore of the lock collar 510 such that the inner surface 512 of the lock collar 510 contacts the outer surface 502 of the shaft 501. In such an example, the lock collar 510 and the shaft 501 can be co-axial such that a rotational axis of the shaft 501 is aligned with the longitudinal bore axis of the lock collar 510.

In the example of FIG. 5, the lock collar 510 is shown as including opposing surfaces 516 and 518 where the surface 518 can be in contact with a surface of the nose end 524 of the compressor wheel 520. In such an example, the surface 518 and the surface of the nose end 524 of the compressor wheel 520 may be substantially planar and parallel; noting that the surfaces 502 and 512 may be the surfaces that dictate how the lock collar 510 aligns with the shaft 501.

As an example, the surface 516 of the lock collar 510 may be of a shape or shapes that facilitate forming the weld 550. For example, the surface 516 may be planar such that the longitudinal bore axis of the lock collar 510 is perpendicular to the surface 516 and/or where the surface 516 slopes downwardly (e.g., toward the nose end 524 of the compressor wheel 520) when moving in a direction from the surface 512 to the surface 514.

As an example, the lock collar 510 may be a cylindrical wall that has axes of symmetry. As an example, the surfaces 516 and 518 may be of the same dimensions such that either of the surfaces 516 and 518 may be oriented to face the surface of the nose end 524 of the compressor wheel 520.

In the example of FIG. 5, the lock collar 510 can be rotatable about the shaft 501 without the lock collar 510 changing its axial location with respect to the shaft 501. For example, the lock collar 510 can be thread-less and at least a portion of the shaft 501 can be thread-less such that the lock collar 510 may be translatable and rotatable about the shaft 501 without features of either the shaft 501 and the lock collar 510 engaging (e.g., as would mating threads as in the example of FIG. 4).

As an example, the lock collar 510 can be a relatively low mass component that is made of a material that can be melted via a welding process. As an example, the lock collar 510 may be provided as a unitary component that can be welded to the shaft 501.

Upon welding of the lock collar 510 to the shaft 501, one or more components may carry an applied load. For example, one or more loads may be applied to the assembly 500 during welding such that the weld 550 fixes at least one of the loads applied to the assembly 500.

As mentioned, for the assembly 400 of FIG. 4, rotation of the lock nut 410 with respect to the shaft 401 causes the lock nut 410 to translate axially on the shaft 401 such that a load may be increased or decreased (e.g., depending on direction of rotation) with respect to the compressor wheel 420. In the example of FIG. 5, prior to welding of the lock collar 510 to the shaft 501, the lock collar 510 may be rotatable without changing its axial location with respect to the shaft 501 and the lock collar 510 may be translatable axially on the shaft 501 via a sliding motion, which may be performed by hand, by machine, etc. As an example, an assembly process can include placing the lock collar 510 on the shaft 501 (e.g., by machine or by hand) and applying a load. In such an example, once a desired load has been applied, a welding unit may be utilized to direct a beam or beams at at least a portion of the lock collar 510 to melt at least a portion of the lock collar 510 to form a weld pool that can solidify to fix the lock collar 510 to the shaft 501.

As an example, an assembly can include a lock collar that has a circular, cylindrical and accurate shape that is without internal threads such as internal threads of the lock nut 410 of FIG. 4. For example, the lock collar 510 can have a circular, cylindrical and accurate shape that is without internal threads such as threads of the lock nut 410 of FIG. 4. As shown in FIG. 4, the lock nut 410 includes internal threads and the shaft 401 includes external threads where the threads are mating threads such that rotation of the lock nut 410 without rotation of the shaft 401 causes the lock nut 410 to translate axially with respect to the shaft 401.

Where a lock collar is utilized rather than a lock nut, positioning and unbalance control of an assembly process can be improved. As an example, an assembly process may be more accurate and easier and capable of utilization of a tightening process that includes welding a lock collar to a shaft.

As an example, an assembly process may be implemented without torsion during assembling; noting that torsion can impact balancing control. For example, consider torsion that can be introduced via the lock nut 410 of FIG. 4 when the lock nut 410 rotates and contacts one or more other components (e.g., the shaft 401, the compressor wheel 420, etc.). In such an example, rotational movement of the lock nut 410 can impart torsion.

As an example, an assembly process can include applying load in a manner where load is applied directly, for example, in an axial direction. Such an approach may include applying load without torque, without reference to an angle or stretch, etc. Such an approach may be more straightforward when compared to rotating the lock nut 410 of FIG. 4 on the shaft 401 of FIG. 4, which can depend on various factors such as variable material proprieties, friction coefficient, etc. For example, threads of the lock nut 410 and threads of the shaft 401 can introduce friction, heating, relaxation, stresses, etc., that do not occur where the lock collar 510 is welded to the shaft 501 in the example of FIG. 5. For example, the approach of FIG. 5 may help to minimize deformation during assembling and keep an assembly cylindrical and aligned with respect to a rotation axis.

As an example, a reduction in cost may be achieved via use of parts that are thread-less parts compared to use of parts that are threaded parts (e.g., the threaded lock nut 410 and the threaded shaft 401 of FIG. 4).

A method that includes a lock nut with internal threads that is threaded to external threads of a turbocharger shaft to "lock-in" a desired amount of load (e.g., loading) can be controlled via measurement of stretch (e.g., distance), which can be due to elongation of a shaft. For example, such a lock nut-based approach can estimate or infer a desired load via an amount of elongation (e.g., stretch), which may be a distance in a range of tens of microns (e.g., 20 microns to about 80 microns, etc.). In such an example, variations in elongation from assembly to assembly may not necessarily assure a desired amount of load. Further, measurement of elongation may be of lesser accuracy than, for example, direct measurement of load (e.g., force).

As an example, in a force range of about 3000 N to about 6000 N (e.g., consider a compressor wheel with a diameter of about 30 mm to about 60 mm), elongation or stretch may be about 20 microns to about 80 microns. Control of stretch and/or variation thereof may be, for example, plus or minus about 7 microns to about 10 microns; whereas, control of force (e.g., load) can be lower than about 200 N. Thus, a method that includes force or load control may output assemblies that are more accurately specified with respect to loading when compared to a method that includes control based on measurement of distance (e.g., elongation or stretch).

As an example, a substantially fully cylindrical weldable system may be implemented to apply a desired clamping load where a lock collar is welded in accurate manner, to help assure that a load is applied in a relatively permanent manner.

As an example, welding may be utilized as part of a mmore stringent and accurate compressor wheel assembling process that can provide robustness as to vehicle conditions, control and reduction of assembling unbalance of a center housing rotating assembly (CHRA), etc.

As an example, a process can utilize a cylindrical part as a lock collar. As an example, a process can help to assure increased alignment of locking/clamping component, stub shaft (e.g., and potentially compressor wheel and thrust spacer) with respect to a shaft's rotation axis. As an example, a process may be a simplified process in one or more aspects and may provide for more accurate compressor wheel tightening as well as diminishing torque and angle or/and stretch issues.

As an example, a process can include one or more fully circular, cylindrical and accurately shaped components, for example, without radial thread positioning design issues (e.g., to enhance unbalance control). As an example, a process can be a welding process that may be implemented without torsion during assembling (e.g., noting that torsion can impact balance control). As an example, an assembly process can apply load without applying a substantial amount of one or more of torque, angle or stretch, for example, depending on variable material proprieties, friction coefficient, etc. As an example, a process can improve CHRA balancing rolled throughput yield (RTY).

As an example, a lock collar as welded to a shaft can include an amount of material that is sufficient for purposes of material removal for balancing. As an example, a compressor wheel can include a nose portion where a welded lock collar is adjacent to the nose portion and where one or more of the nose portion and the welded lock collar can be utilized for balancing via material removal. As an example, an assembly can include a compressor wheel that includes a nose portion where balancing is achieved via material removal from the nose portion rather than, for example, material removal from a welded lock collar that is welded to clamp the compressor wheel to a shaft. As an example, a lock collar, a shaft, a thrust collar and a compressor wheel can be made of metallic material, for example, consider one or more metals and/or one or more alloys.

Figure 6:
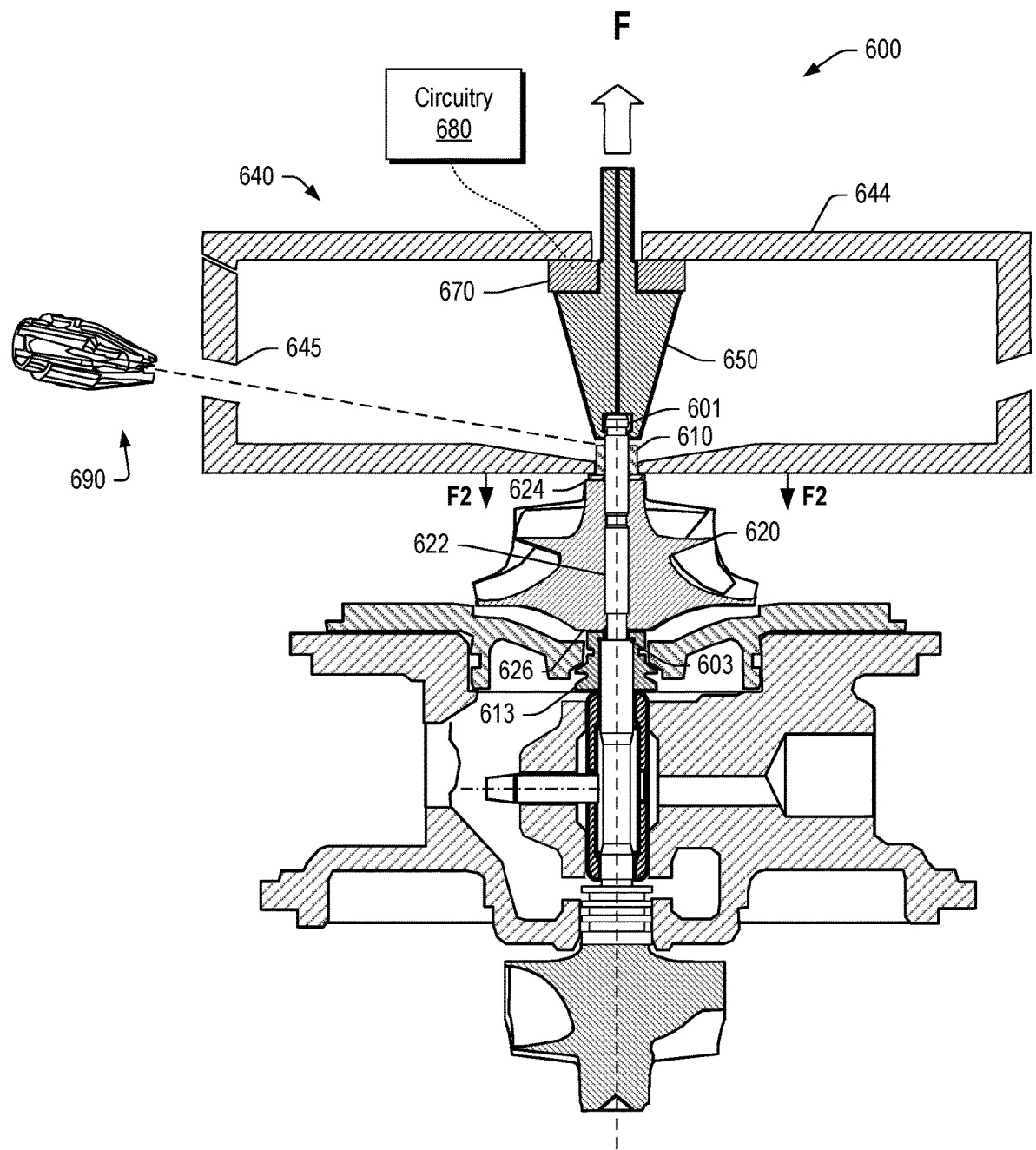
FIG. 6 is a diagram of an example of an assembly.

FIG. 6 shows an example of an assembly 600 that includes a force applicator 640 that can include one or more arms 644 and one or more openings 645. As shown, the assembly 600 also includes a puller 650 and a load cell 670, which may be operatively coupled to circuitry 680. For example, the circuitry 680 can provide information output by the load cell 670 that may be utilized in a control system (e.g., a controller) to control an amount of force (e.g., load) applied (e.g., by the force applicator 640 and/or the puller 650).

As an example, a load cell can be a transducer that can generate an electrical signal where a characteristic of the electrical signal (e.g., magnitude) is related to force being measured (e.g., optionally directly proportional to the force being measured). As an example, a load cell may be one or more of a hydraulic load cell, a pneumatic load cell, a strain gauge load cell or another type of load cell. As an example, a load cell may be operatively coupled to a controller, which may be utilized to control one or more pieces of equipment.

In the example of FIG. 6, the assembly 600 can be operatively coupled to a center housing rotating assembly (CHRA), which includes a shaft 601, a lock collar 610, a thrust collar 613, and a compressor wheel 620 where the shaft 601 extends through a bore 622 of the compressor wheel 620, where the lock collar 610 abuts a nose end 624 of the compressor wheel 620, where the thrust collar 613 abuts a base end 626 of the compressor wheel 620 and where the thrust collar 613 abuts a surface 603 of the shaft 601 (e.g., an annular face that defines a shoulder of a shaft, etc.).

In the example of FIG. 6, the thrust collar 613 includes an interior surface (e.g., an annular face) that abuts the surface 603 of the shaft 601. In such an example, the surface 603 of the shaft 601 may be closer to the base end 626 of the compressor wheel 620 and, for example, alignment (e.g., planar alignment) may be less impacted by volume of material of the thrust collar 613 (e.g., such an arrangement can reduce the amount of thrust collar material between a load bearing surface of a shaft and a base end of a compressor wheel). In the example of FIG. 6, the thrust collar 613 can include an axial thickness that defines an axial distance between the surface 603 of the shaft 601 and the base end 626 of the compressor wheel 620. Various surfaces can be planar and aligned to be substantially parallel such that various axes are substantially aligned.

FIG. 6 shows an example of a beam emitter such as a laser beam emitter that can direct an energy beam at the lock collar 610 to form a weld pool of material that includes at least material of the lock collar 610 where, upon solidification of the weld pool (e.g., cooling to a solidification temperature), a weld can be formed that fixes the lock collar 610 to the shaft 601.

Figure 7:
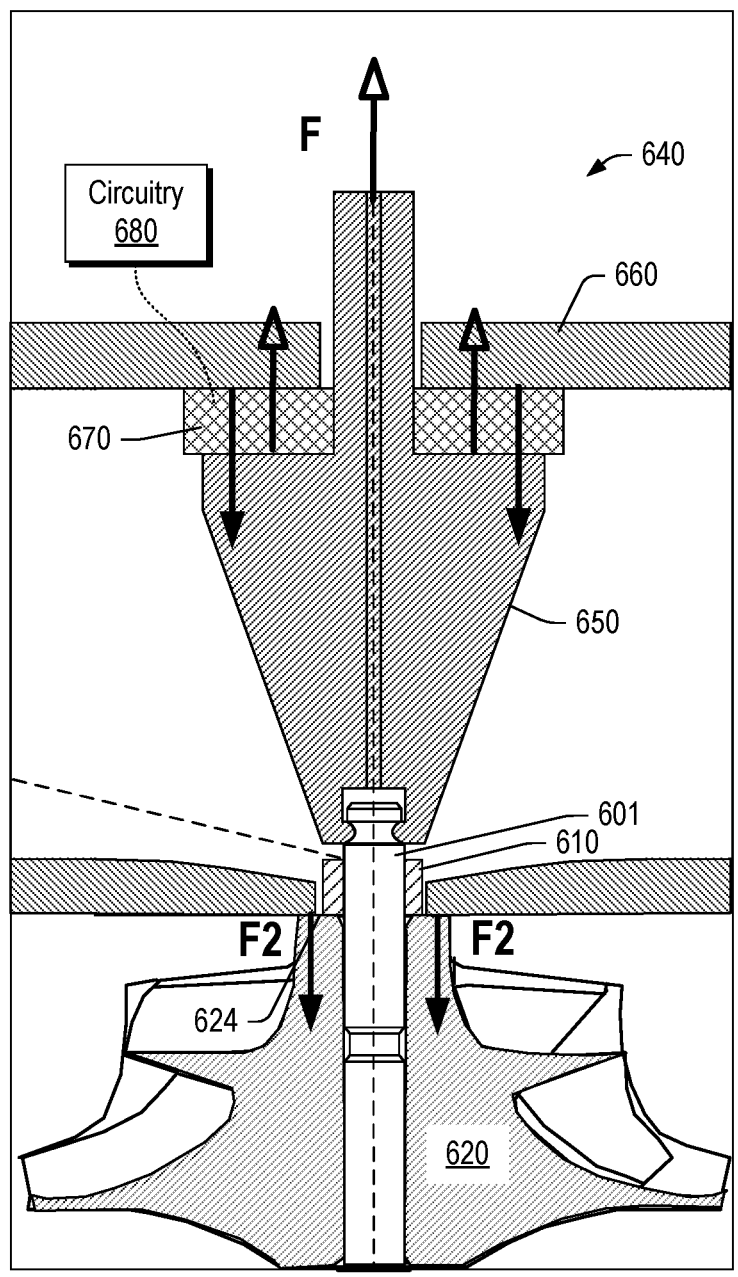
FIG. 7 is a diagram of a portion of the assembly of FIG. 6.

FIG. 7 shows a portion of the assembly 600 of FIG. 6. In the example of FIG. 7, force F and force F2 are illustrated as may be considered in a clamping process that implements the force applicator 640 to achieve a desired state of a CHRA. As an example, the force F can be a load or clamping force that can be "locked-in" via welding of the lock collar 610 to the shaft 601. As an example, a force diagram can include forces illustrated with respect to a thrust collar where present. For example, force arrows may be illustrated with respect to the thrust collar 613 and the compressor wheel 620 and/or with respect to the thrust collar 613 and the surface 603 of the shaft 601.

In the example of FIG. 7, the force applicator 640 includes a puller 650 that can clamp an end portion of the shaft 601 and, for example, one or more members 660 that can contact the compressor wheel 620. For example, the one or more members 660 may be a cylindrical member, a multi-prong member, etc. The one or more members 660 can include a flat and/or a contoured surface or surfaces that can seat against one or more surfaces of the compressor wheel 620.

In the example of FIG. 7, the lock collar 610 may be freely translatable with respect to the shaft 601 such that axial movement of the compressor wheel 602 results in axial movement of the lock collar 610. In such an example, the lock collar 610 can ride on the nose end 624 of the compressor wheel 620. As an example, the lock collar 610 may contact the nose end 624 with force due to gravity. As an example, the assembly 600 may be aligned with respect to gravity such that a rotational axis of the shaft 601 is aligned with gravity (e.g., the shaft 601 can be vertical).

As shown, the force applicator 640 includes the puller 650 that can clamp an end portion of the shaft 601. In the example of FIG. 7, the one or more members 660 of the force applicator 640 can contact the compressor wheel 620. For example, the one or more members 660 may be a cylindrical member, a multi-prong member, etc., that contact the nose end 624 of the compressor wheel 620 at one or more points, surfaces, etc. The one or more members 660 can include a flat and/or a contoured surface or surfaces that can seat against, for example, a surface of the nose end 624 of the compressor wheel 620.

As mentioned, in the example of FIG. 6, the force applicator 640 can include the load cell 670, which may be operatively coupled to the circuitry 680, for example, to control an assembly process that can include welding. As shown, a line of sight can exist for an energy beam (see dashed line) that can be directed to the lock collar 610, for example, at or near an interface between the lock collar 610 and the shaft 601 to form a weld pool or weld pools that can solidify to secure (e.g., fix) the lock collar 610 to the shaft 601. In such an example, an applied amount of load as applied by the force applicator 640 may be "locked-in".

As an example, compressor wheel nose compression, in an assembly process that includes welding, may be specified according to a minimum load, for example, of about 3500 N or more with a load variability of about 5 percent to about 20 percent. For example, consider a minimum load of about 3000 N and a maximum load of about 4000 N. As an example, depending on dimensions, stretching of a shaft may be in a range of about 55 microns to about 65 microns. As an example, a seating surface (e.g., force application surface, etc.) may be about 10 square millimeters to about 30 square millimeters. For example, consider a seating surface of about 20 square millimeters for a diameter of about 9 millimeters at a nose portion of a compressor wheel.

As an example, as to compressor wheel hub compression, a process can include compressing a compressor wheel during load relaxation. As an example, consider a minimum load after relaxation of about 3500 N, with, for example, a relaxation of about 25 microns (e.g., based on stretch). In such an example, where load variability may be about 5 percent to about 10 percent, minimum and maximum forces can be determined along with estimates of stretch at contact and final stretch. In turn, a seating surface area may be determined.

As an example, a process can include determining a load precision and determining a shape and/or size of a counter load surface. As an example, a process can include determining a load precision and determining how to position a force applicator to not generate added stress. In such examples, calculations can be utilized to determine how much to grip during an assembly process.

Figure 8:
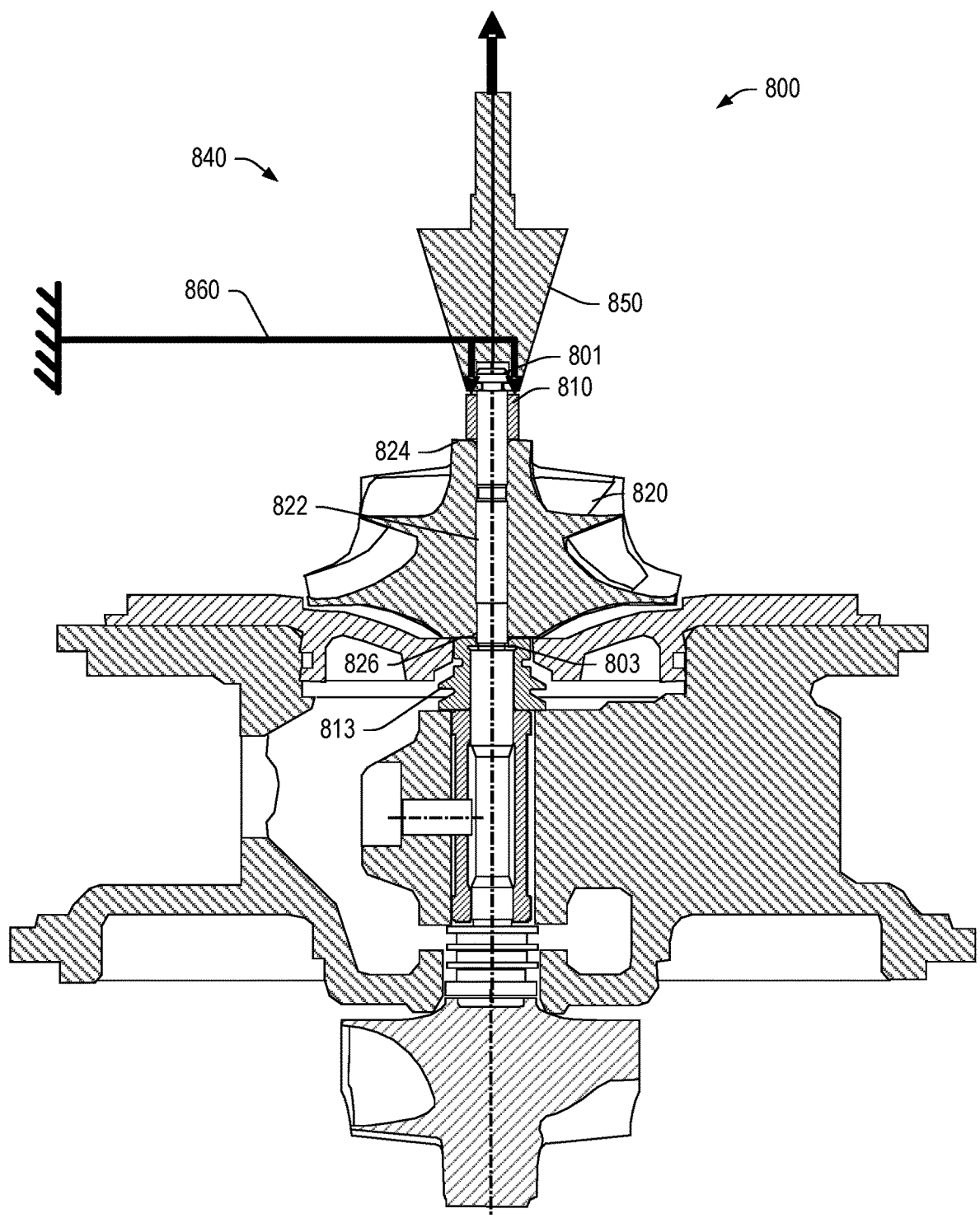
FIG. 8 is a diagram of an example of an assembly.

FIG. 8 shows an example of an assembly 800 that includes a force applicator 840 that includes a puller 850 and one or more arms 860. In the example of FIG. 8, the assembly 800 can be operatively coupled to a center housing rotating assembly (CHRA), which includes a shaft 801, a lock collar 810, a thrust collar 813, and a compressor wheel 820 where the shaft 801 extends through a bore 822 of the compressor wheel 820, where the lock collar 810 abuts a nose end 824 of the compressor wheel 820, where the thrust collar 813 abuts a base end 826 of the compressor wheel 820 and where the thrust collar 813 abuts a surface 803 of the shaft 801 (e.g., an annular face that defines a shoulder of a shaft, etc.).

In the example of FIG. 8, the force applicator 840 can apply force to the lock collar 810. In such an example, when a desired amount of force is applied, a welding process can include welding the lock collar 810 to the shaft 801.

Figure 9:
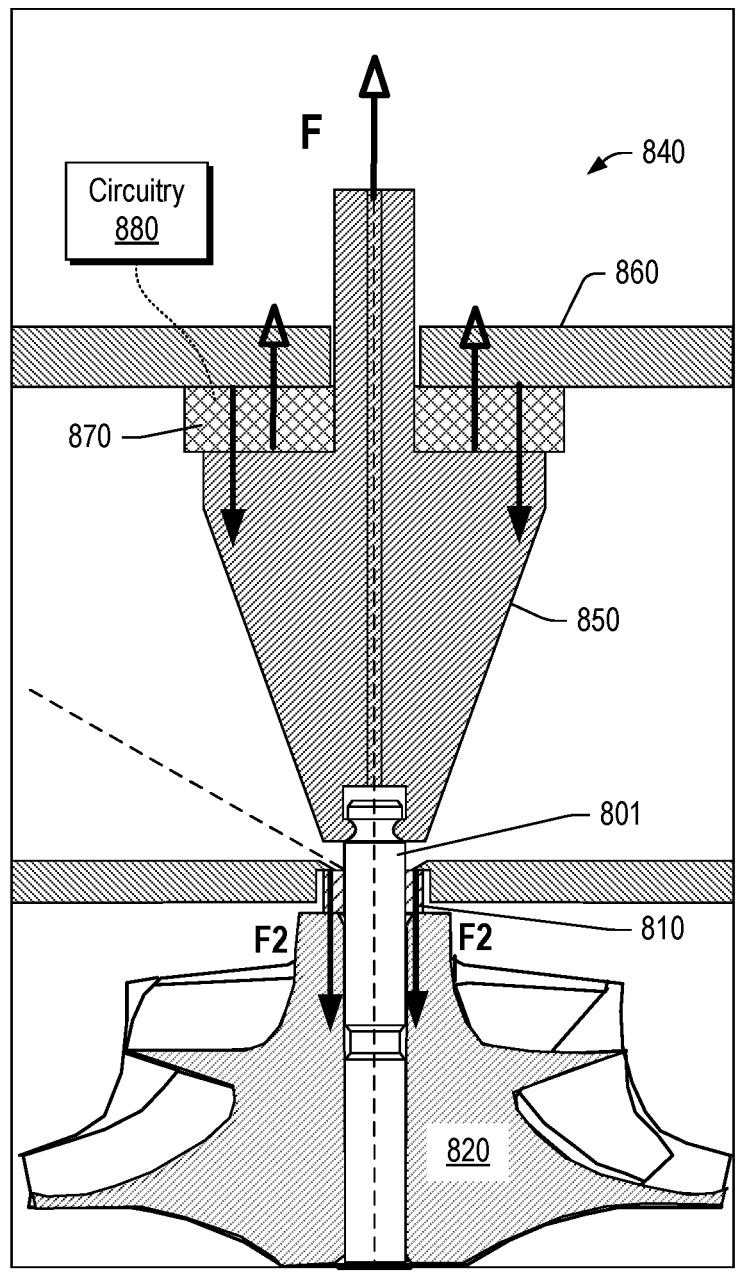
FIG. 9 is a diagram of an example of an assembly that includes components of the assembly of FIG. 8.

FIG. 9 shows a portion of the assembly 800 of FIG. 8. As shown, the assembly 800 also includes a load cell 870, which may be operatively coupled to circuitry 880. In the example of FIG. 9, force F and force F2 are illustrated as may be considered in a clamping process that implements the force applicator 840 to achieve a desired state of a CHRA. As an example, the force F can be a load or clamping force that can be "locked-in" via welding of the lock collar 810 to the shaft 801. As an example, a force diagram can include forces illustrated with respect to a thrust collar where present. For example, force arrows may be illustrated with respect to the thrust collar 813 and the compressor wheel 820 and/or with respect to the thrust collar 813 and the surface 803 of the shaft 801.

In the example of FIG. 9, the force applicator 840 includes a puller 850 that can clamp an end portion of the shaft 801 and, for example, one or more members 860 that can contact the lock collar 810. For example, the one or more members 860 may be a cylindrical member, a multi-prong member, etc. The one or more members 860 can include a flat and/or a contoured surface or surfaces that can seat against one or more surfaces of the lock collar 810.

As an example, the assembly 800 may be aligned with respect to gravity such that a rotational axis of the shaft 801 is aligned with gravity (e.g., the shaft 801 can be vertical).

As mentioned, in the example of FIG. 9, the force applicator 840 can include the load cell 870, which may be operatively coupled to the circuitry 880, for example, to control an assembly process that can include welding. As shown, a line of sight can exist for an energy beam (see dashed line) that can be directed to the lock collar 810, for example, at or near an interface between the lock collar 810 and the shaft 801 to form a weld pool or weld pools that can solidify to secure (e.g., fix) the lock collar 810 to the shaft 801. In such an example, an applied amount of load as applied by the force applicator 840 may be "locked-in".

Figure 10:
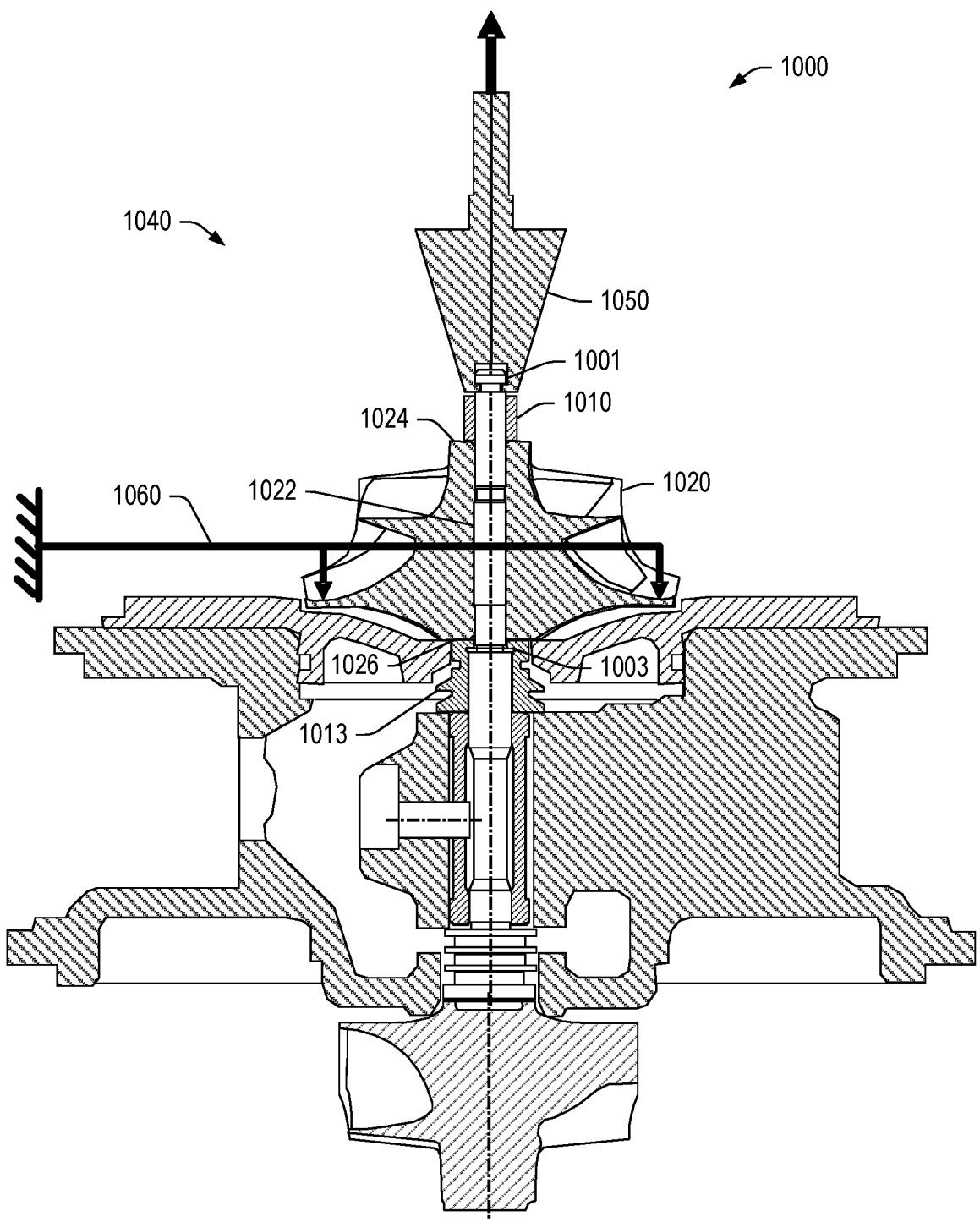
FIG. 10 is a diagram of an example of an assembly.

FIG. 10 shows an example of an assembly 1000 that includes a force applicator 1040 that includes a puller 1050 and one or more arms 1060. In the example of FIG. 10, the assembly 1000 can be operatively coupled to a center housing rotating assembly (CHRA), which includes a shaft 1001, a lock collar 1010, a thrust collar 1013, and a compressor wheel 1020 where the shaft 1001 extends through a bore 1022 of the compressor wheel 1020, where the lock collar 1010 abuts a nose end 1024 of the compressor wheel 1020, where the thrust collar 1013 abuts a base end 1026 of the compressor wheel 1020 and where the thrust collar 1013 abuts a surface 1003 of the shaft 1001 (e.g., an annular face that defines a shoulder of a shaft, etc.).

In the example of FIG. 10, the force applicator 1040 can apply force to the compressor wheel 1020 at a hub portion (e.g., at or above a z-plane of the compressor wheel 1020). In such an example, when a desired amount of force is applied, a welding process can include welding the lock collar 1010 to the shaft 1001

Figure 11:
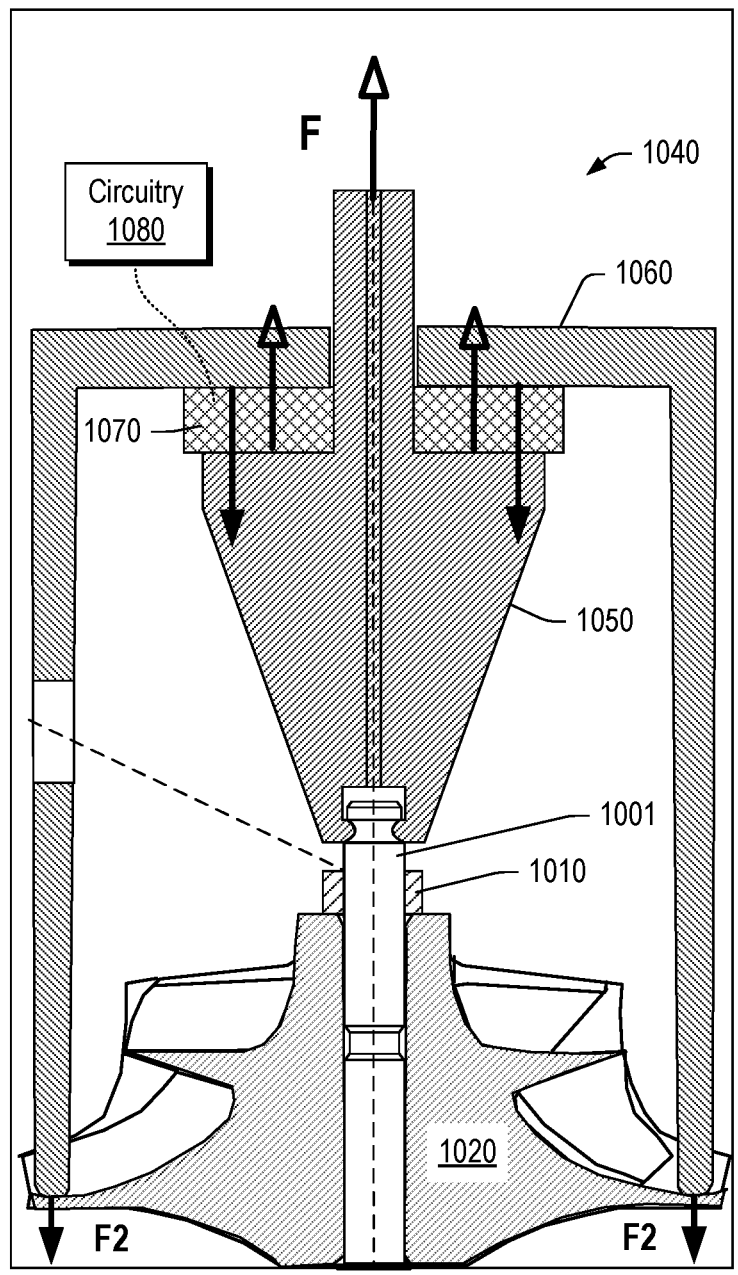
FIG. 11 is a diagram of an example of an assembly that includes components of the assembly of FIG. 10.

FIG. 11 shows a portion of the assembly 1000 of FIG. 10. As shown, the assembly 1000 also includes a load cell 1070, which may be operatively coupled to circuitry 1080. In the example of FIG. 11, force F and force F2 are illustrated as may be considered in a clamping process that implements the force applicator 1040 to achieve a desired state of a CHRA. As an example, the force F can be a load or clamping force that can be "locked-in" via welding of the lock collar 1010 to the shaft 1001. As an example, a force diagram can include forces illustrated with respect to a thrust collar where present. For example, force arrows may be illustrated with respect to the thrust collar 1013 and the compressor wheel 1020 and/or with respect to the thrust collar 1013 and the surface 1003 of the shaft 1001.

In the example of FIG. 11, the force applicator 1040 includes a puller 1050 that can clamp an end portion of the shaft 1001 and, for example, one or more members 1060 that can contact the compressor wheel 1010. For example, the one or more members 1060 may be a cylindrical member, a multi-prong member, etc. The one or more members 1060 can include a flat and/or a contoured surface or surfaces that can seat against one or more surfaces of the compressor wheel 1020.

As an example, the assembly 1000 may be aligned with respect to gravity such that a rotational axis of the shaft 1001 is aligned with gravity (e.g., the shaft 1001 can be vertical).

As mentioned, in the example of FIG. 11, the force applicator 1040 can include the load cell 1070, which may be operatively coupled to the circuitry 1080, for example, to control an assembly process that can include welding. As shown, a line of sight can exist for an energy beam (see dashed line) that can be directed to the lock collar 1010, for example, at or near an interface between the lock collar 1010 and the shaft 1001 to form a weld pool or weld pools that can solidify to secure (e.g., fix) the lock collar 1010 to the shaft 1001. In such an example, an applied amount of load as applied by the force applicator 1040 may be "locked-in".

As an example, the assembly 600, 800 and/or 1000 may be utilized in one or more processes that aim to avoid shaft bending after loading and that aim to minimize added mass. Such a process or processes may aim to assemble components to for an assembly that has low unbalance as measured at a compressor wheel nose (e.g., low mass and low bending). Such a process or processes can utilize load control rather than, for example, stretch control. As an example, a process or processes can include balancing where mass may be removed from a lock collar that includes a weld.

Figure 12:
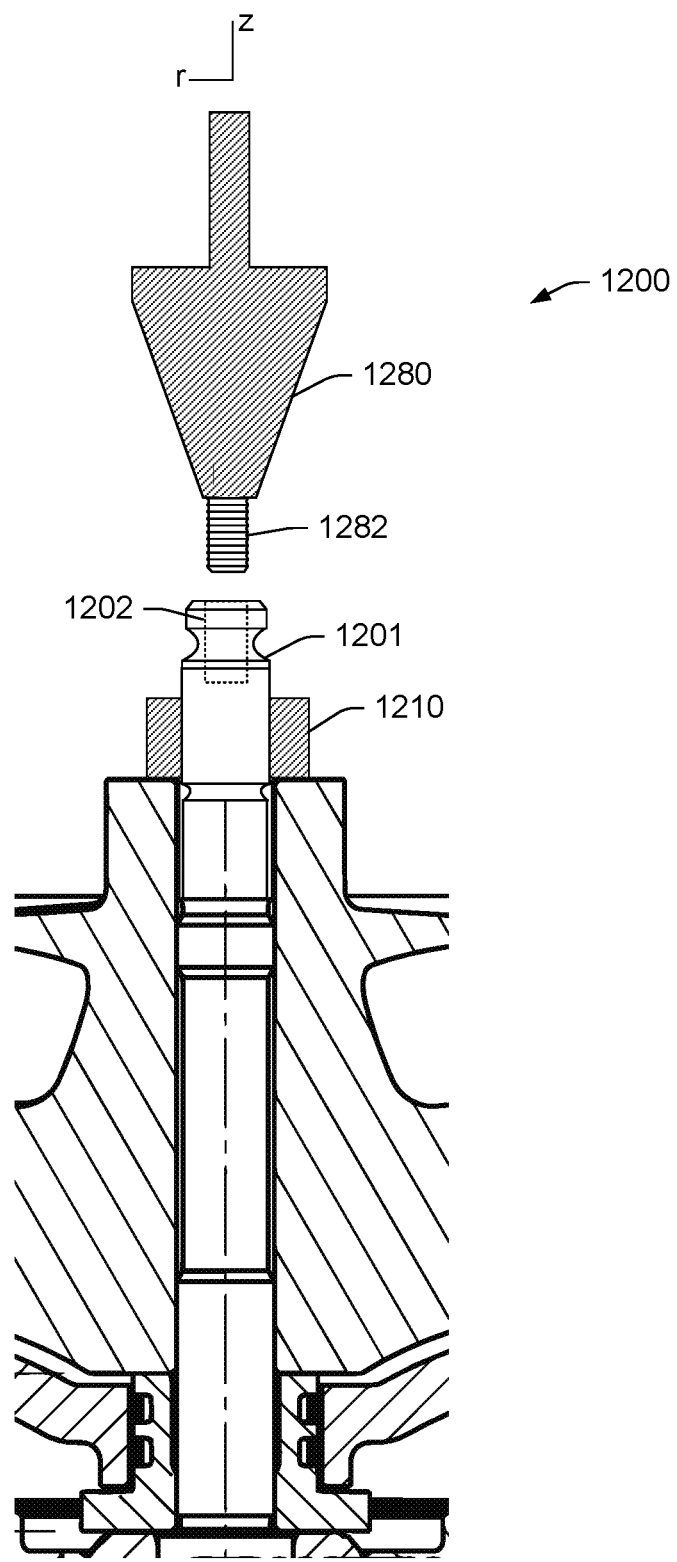
FIG. 12 is a diagram of an example of an assembly.

FIG. 12 shows an example of an assembly 1200 where a shaft 1201 includes internal threads 1202 and where a lock collar 1210 is fit to the shaft 1201. As shown, the internal threads 1202 may receive external threads 1282 of a portion of a tool 1280, which may be a puller (see, e.g., the puller 650, 850 and 1050). In the example of FIG. 12, the tool 1280 can apply force to the shaft 1201 where welding may be utilized to fix the lock collar 1210 to the shaft 1201.

Figure 13:
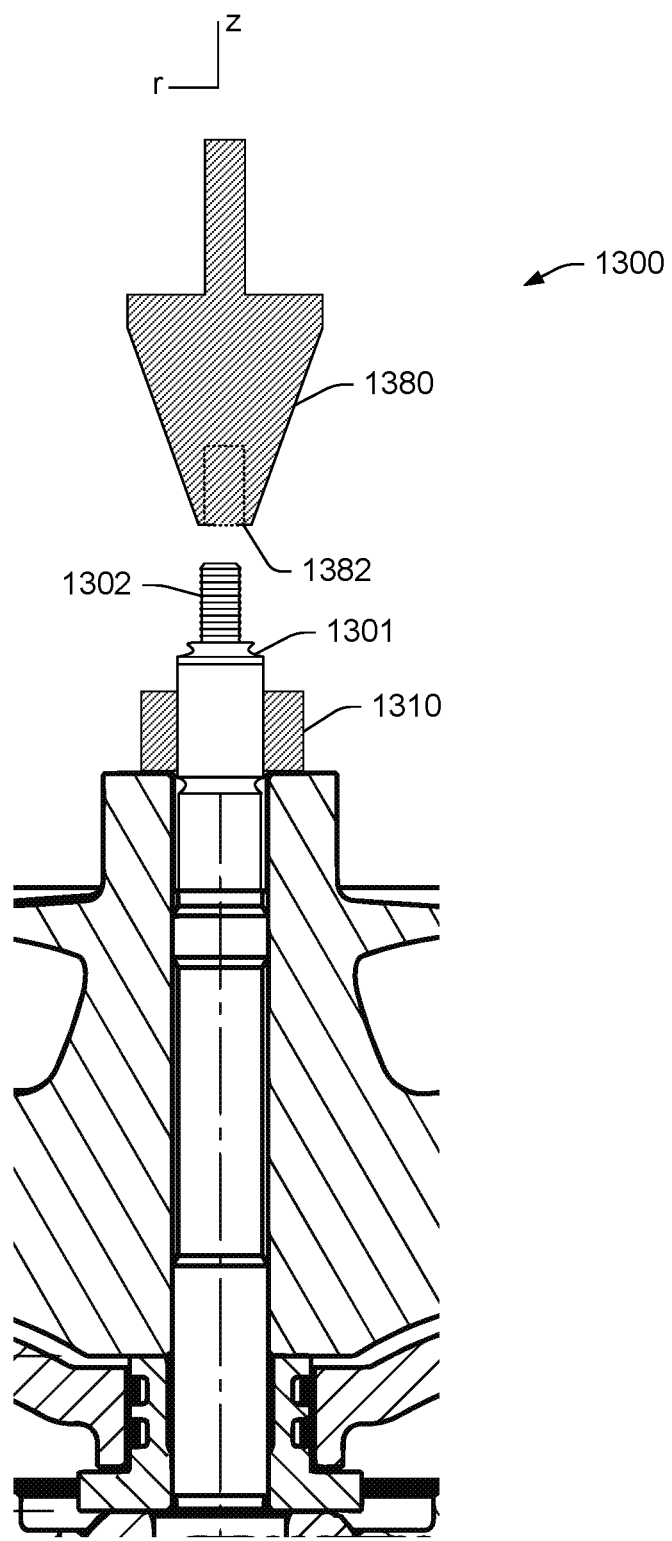
FIG. 13 is a diagram of an example of an assembly.

FIG. 13 shows an example of an assembly 1300 where a shaft 1301 includes external threads 1302 and where a lock collar 1310 is fit to the shaft 1301. As shown, the external threads 1302 may be received by internal threads 1382 of a portion of a tool 1380, which may be a puller (see, e.g., the puller 650, 850 and 1050). In the example of FIG. 13, the tool 1380 can apply force to the shaft 1301 where welding may be utilized to fix the lock collar 1310 to the shaft 1301.

Figure 14:
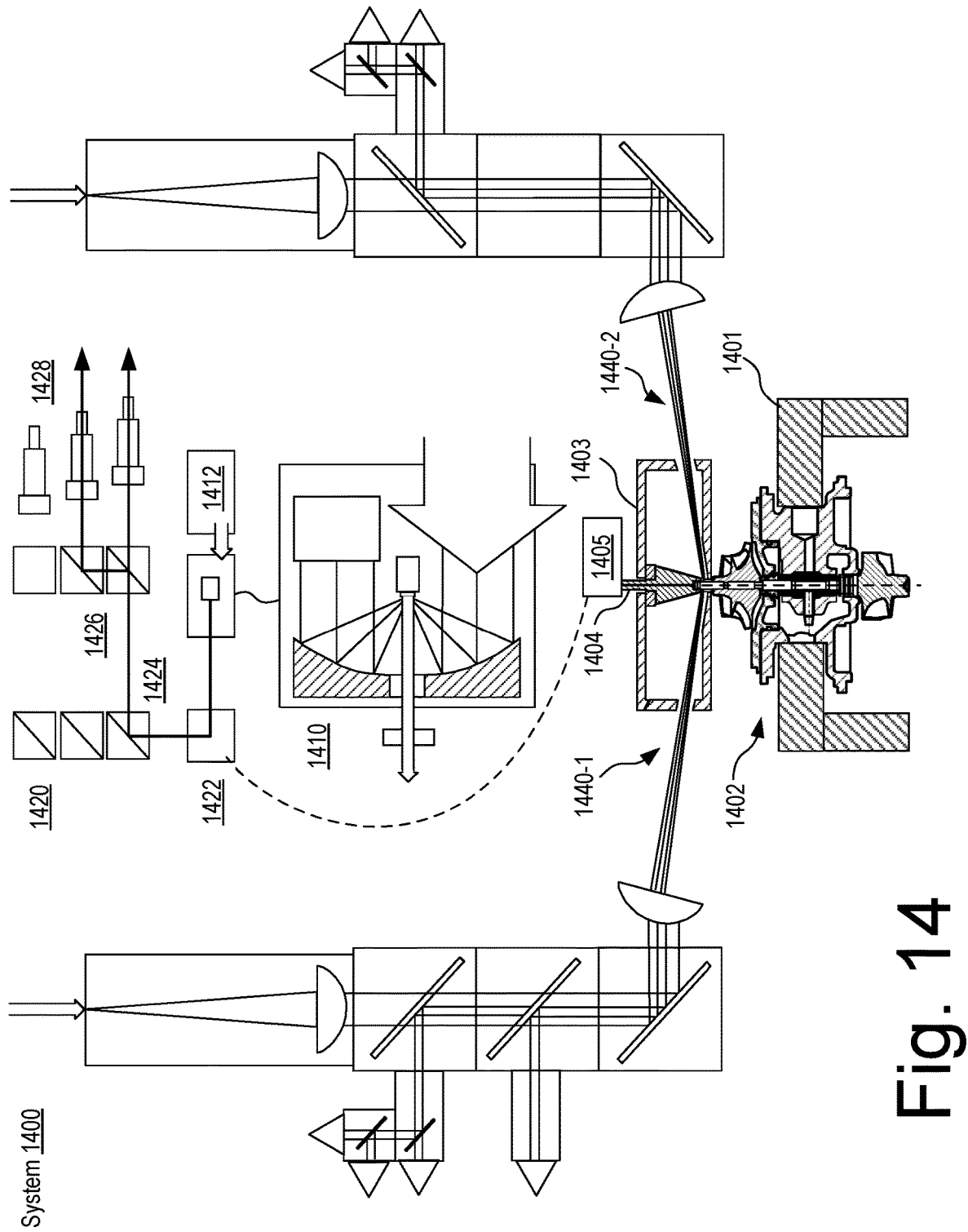
FIG. 14 is a diagram of an example of a system.

FIG. 14 shows an example of a system 1400 that can include one or more branches for one or more beams. In such an example, a single beam unit may generate a beam that can be split into multiple beams where each of the beams may be directed via its own beam path. For example, the beams 1440-1 and 1440-2 may be from a split beam or may be from independent beam generators.

As shown in FIG. 14, the workpiece can include features of the assembly 600 of FIG. 6. In FIG. 14, a brace 1401 secures a rotating assembly 1402 while loading equipment 1403 and 1404 can be controlled (e.g., via a power control unit 1422, another controller 1405, etc.) to apply one or more loads, which may be according to a loading schedule. Such a loading schedule may account for one or more factors such as, for example, type and/or size of the workpiece and/or particular components thereof. In the example of FIG. 14, the brace 1401 can clamp the rotating assembly 1402 in a manner where, for example, a shaft and wheel assembly (SWA) has its rotational axis substantially aligned with gravity. In such an example, the effect of gravity on the rotating assembly 1402 may be minimized with respect to gravity being a factor that can cause axial misalignment (e.g., consider shifting of a bearing system in a bore of a housing, etc.).

In the example of FIG. 14, the use of multiple beams may provide for "locking-in" a desired load. For example, where multiple beams are utilized and aimed at different portions of a lock nut (e.g., a lock nut and shaft interface), two or more beams may be energized simultaneously such that forces (e.g., including stresses) are more uniformly distributed about the lock nut and the shaft. As an example, the beams 1440-1 and 1440-2 may be positioned at approximately 180 degrees from each other.

As an example, a method can include spot welding and/or continuous welding where, for example, one or more components move with respect to each other while welding occurs (e.g., while an energized beam is directed at the one or more components). As an example, one or more of the beams 1440-1 and 1440-2 may move and/or one or more of the rotating components of the rotating assembly 1402 may move. As an example, a method can include forming a plurality of spot welds. As an example, a method can include forming at least one spot weld. As an example, a method can include forming at least one continuous weld. As an example, a method can include forming at least one spot weld and forming at least one continuous weld. As an example, a method can include forming multiple welds simultaneously.

As an example, the system 1400 can include a disk laser module 1410 that may feed a distribution subsystem 1420. As an example, the disk laser module 1410 can include a diode-pumped thin-disk laser operating at about 1030 nm. For example, consider a pumping unit 1420 that includes diodes with energy emission at about 941 nm where such energy can be directed to a Yb:YAG disk of the disk laser module 1410.

Optics can include a parabolic mirror and a retro-reflective mirror where not-absorbed power can be imaged multiple times, for example, to optimize efficiency. As an example, a single disk may produce up to about 3.5 kilowatts of power, operating in the near-infrared (NIR) at a wavelength of about 1030 nm. As an example, multiple disks may be cascaded to achieve higher power levels. A controller may provide for selection of different laser parameters such as, for example, operational mode, power level, and beam quality. A Yb:YAG disk laser may generate a smaller beam size (e.g., spot size) than a Nd:YAG laser, which, in turn, may allow for high energy density.

In the example of FIG. 14, the distribution subsystem 1420 receives a laser beam from the disk laser module 1410. The distribution subsystem 1420 is shown as including a power control unit 1422, switches 1424, splitters 1426 and couplings 1428. Such couplings may direct individual laser beams to paths of the system 1400, for example, to perform welding via one or more laser beams.

As an example, one or more sensors may sense information that may be suitable for detection of a change in power of one or more laser beams (e.g., an indirect detection technique). As to one or more sensors, consider as an example one or more of a temperature sensor, a back reflection sensor, a plasma sensor and a camera (e.g., a CMOS camera, etc.). As an example, a sensor such as a temperature sensor, a back reflection sensor or a plasma sensor may operate at sampling rates of the order of about tens of kilohertz. As an example, a camera sensor may operate at a sampling rate of the order of about a thousand hertz.

As to a power sensor for sensing laser power directly, a welding head can include a protective window cartridge that can provide temperature information from which power of a laser beam may be determined. As an example, a power sensor for sensing laser power directly may include components for laser power calorimetrically. For example, an absorber may be radiated by at least a portion of a laser beam for a defined time period where thermal capacity and temperature rise of the absorber are known. Given such information, laser power can be calculated.

Referring again to the power control unit 1422 of FIG. 14 (e.g., a controller), a closed-loop technique may be implemented as to power control where, for example, one or more sources are regulated where the one or more sources create a laser beam (see, e.g., the pumping diodes 1412). In such an example, the power control unit 1422 may be operatively coupled to another controller such as the controller 1405 that can control force applied to the rotating assembly 1402. As an example, the system 1400 can include a single controller or multiple controllers, which may operate in a coordinated manner to apply force As an example, a laser beam may be characterized, for example, by one or more of beam power, beam diameter and beam position of an unfocussed beam, beam diameter and beam position in the focus and polarization of the beam.

Figure 15:
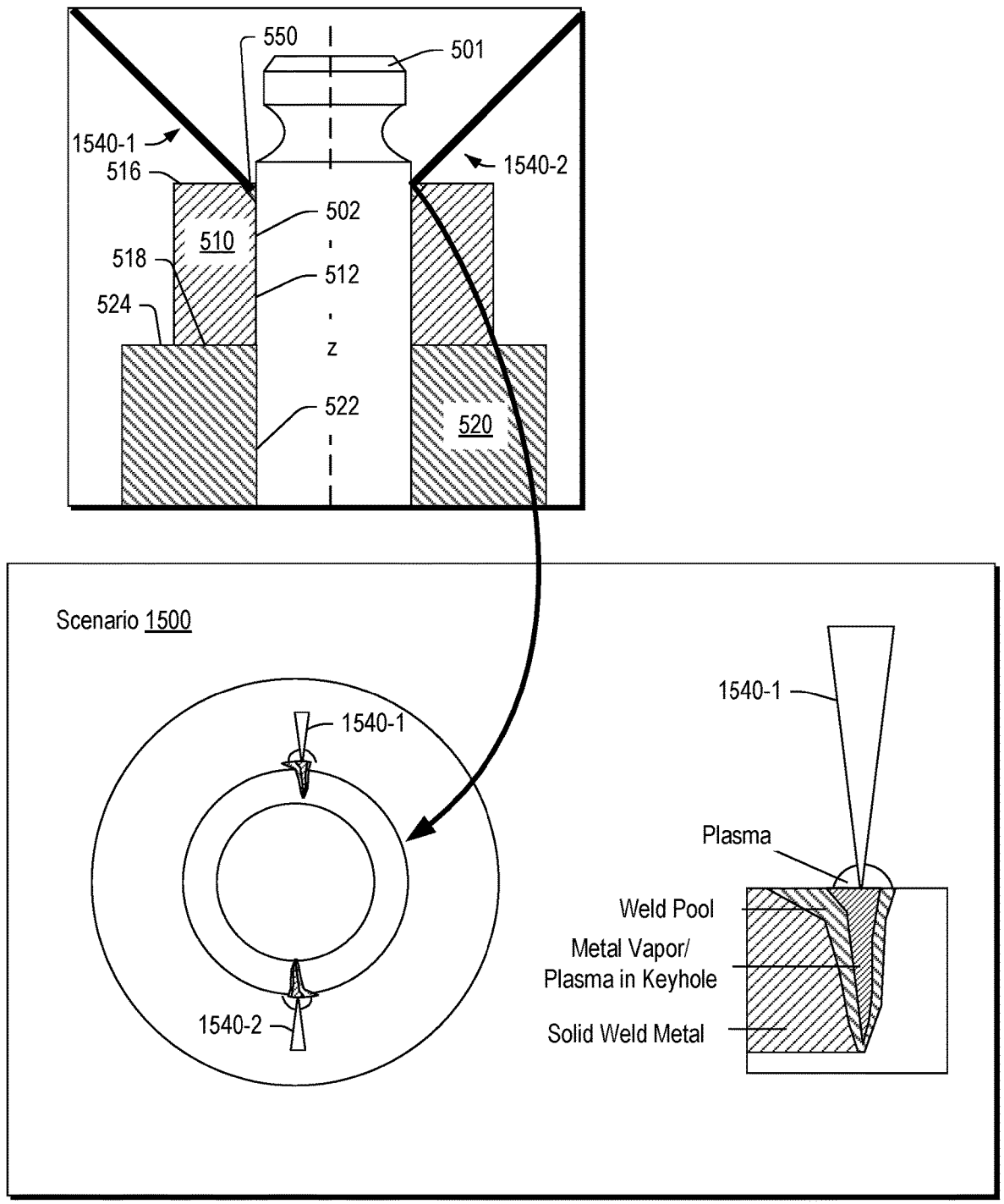
FIG. 15 is a diagram of an example of welding.

FIG. 15 shows an example scenario 1500 with respect to the example assembly of FIG. 5, which includes the beam 1540-1 and the beam 1540-2 being directed toward a joint formed by the lock collar 510 and the shaft 501. As illustrated for the beam 1540-1, a weld pool may be formed along with one or more plasmas. As an example, a depth of penetration of a beam may be controlled, for example, to control at least in part weld depth. For example, a keyhole depth may be controlled to form a weld between the lock collar 510 and the shaft 501.

As an example, the system 1400 of FIG. 14 may be employed to form the weld regions of the scenario 1500. As an example, control for welding may include one or more of position control, rotation control, gas control, temperature control, energy control, focal point control, beam spot size control, plasma control, etc.

As an example, a turbocharger SWA can include a shaft portion made of a first material where a lock collar may optionally be made of the same material. In such an example, welding involves forming a weld with a common material. As an example, a turbocharger SWA can include a shaft portion made of a first material where a lock collar may optionally be made of a second, different material. In such an example, welding involves forming a weld with two different materials. As an example, where a filler material is included at a joint prior to welding, yet another material may be present. As an example, a method can include joining of a lock collar made of a material that includes one or more metals to a low-alloy steel shaft to form a shaft with a secured compressor wheel as a unit where joining includes welding with one or more beams.

As an example, a method can include welding a turbine wheel to a shaft to form a SWA and then securing a compressor wheel to the shaft via another weld that welds a lock collar to the shaft. In such an example, a rotating group of a rotating assembly (e.g., a CHRA) can include a doubly welded shaft where welds are utilized, functionally, to secure a turbine wheel and a compressor wheel to the shaft. As an example, a welding system may be utilized to perform welding of a turbine wheel to a shaft and to perform welding of a lock collar to a shaft. For example, the system 1400 of FIG. 14 may optionally be utilized to perform two forms of welding, a first welding of a turbine wheel to a shaft to form a SWA and a second welding of a lock collar to the shaft to secure a compressor wheel to the SWA.

As an example, where a turbocharger includes a variable geometry turbine assembly, such as in the example of FIG. 2, a welding system may be utilized to form one or more welds for the variable geometry turbine assembly. For example, a vane may be a welded component where another component is welded to a vane (e.g., consider a vane shaft, a coupling to a vane, a coupling to a vane shaft, etc.).

As an example, a beam or beams may be utilized to perform balancing. For example, a beam may be directed to a portion of a component to remove material from that component. As an example, a welding system such as the welding system 1400 of FIG. 14 (e.g., or a portion thereof) may be utilized to perform one or more welding operations and one or more material removal operations. For example, a laser beam may be directed to a lock collar (e.g., and/or another component such as a nose of compressor wheel) to remove material from the lock collar (e.g., and/or the other component).

As an example, a single welding station with a welding system may be utilized to perform multiple operations that include one or more of welding a turbine wheel to a shaft, welding a lock collar to a shaft to secure a compressor wheel to the shaft and removal of material via a welding beam (e.g., laser beam, electron beam, etc.) to balance a rotating assembly that includes a shaft, a turbine wheel and a compressor wheel where the removal of material may remove material from one or more components (e.g., a lock collar, another component operatively coupled to a shaft, and/or a nose of a compressor wheel).

Figure 16:
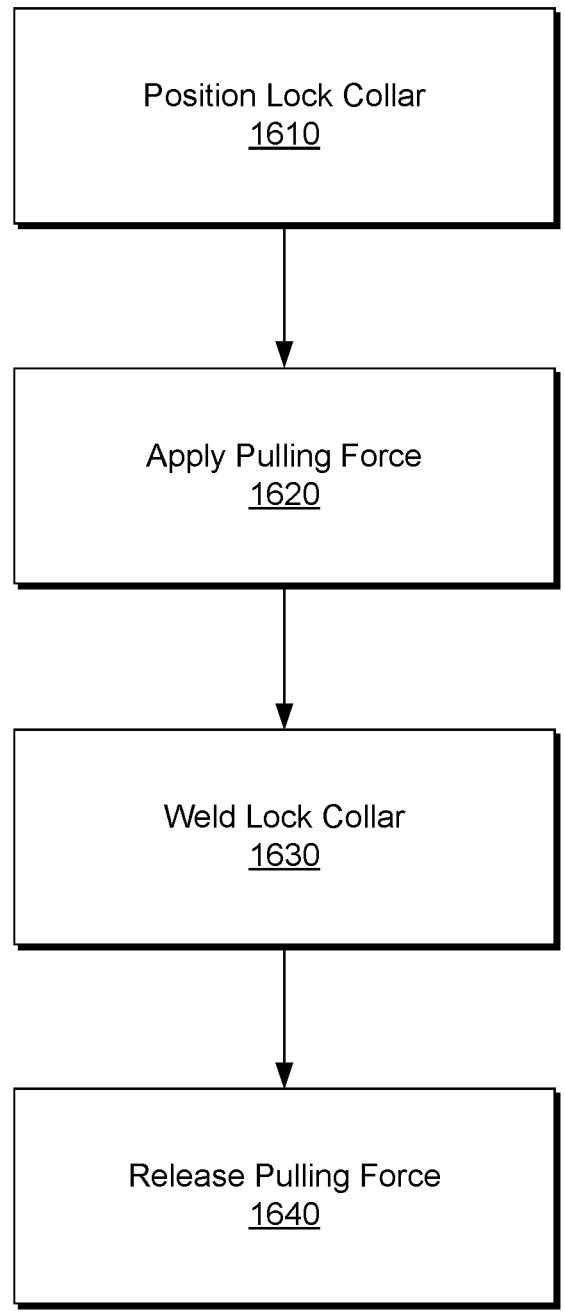
FIG. 16 is a block diagram of an example of a method.

FIG. 16 shows an example of a method 1600 that includes a position block 1610 for positioning a lock collar with respect to a shaft and a compressor wheel, an application block 1620 for applying a pulling force 1620, a weld block 1630 for welding the lock collar to the shaft and a release block 1640 for releasing the pulling force.

In such an example, the application block 1620 may include applying a pulling force until a desired amount of force is achieved, which may automatically trigger the weld block 1630 such that the desired amount of force is "locked into" an assembly (e.g., an assembly that includes a compressor wheel and a turbocharger shaft).

As an example, the method 1600 can include applying force that is in a range of approximately 4000 N to approximately 5000 N. Such an approach may be force controlled rather than, for example, stretch controlled. As to stretch control, a stretch controlled process may aim to stretch a shaft by a distance in a range of approximately 30 microns to approximately 60 micron for a compressor wheel that has a diameter of approximately 44 mm.

As an example, a controller that is operatively coupled to one or more load cells may provide for control with an accuracy that is less than approximately ±200 N. For example, consider a controller that can control with approximately ±150 N accuracy. Such an approach may facilitate assembly when compared to a process that aims to control with respect to distance (e.g., consider a process that controls with ±5 microns, to target ±15% accuracy).

As an example, the method 1600 may include applying a force in a range of about 2000 N to about 8000 N. As an example, consider applying a force in a range of about 3000 N to about 6000 N. As an example, consider applying a force in a range of about 4000 N to about 5000 N. As an example, a method can include controlling a force (e.g., a pulling force) to an accuracy that is about 50 N to about 300 N (e.g., plus or minus). As an example, consider a method that includes controlling a force to an accuracy of about +/−150N. Such a method may, in comparison to a method that operates on distance (e.g., a distance in microns) achieve better accuracy and, for example, improve assembly to assembly consistency with respect to a target value.

Figure 17:
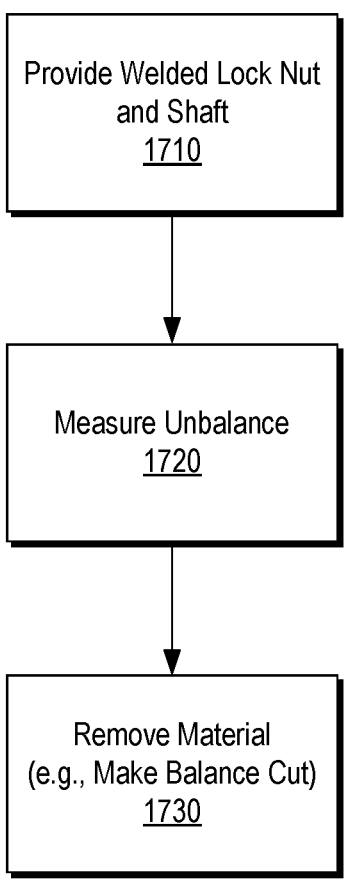
FIG. 17 is a block diagram of an example of a method with reference to an example of an assembly.
Figure 17:
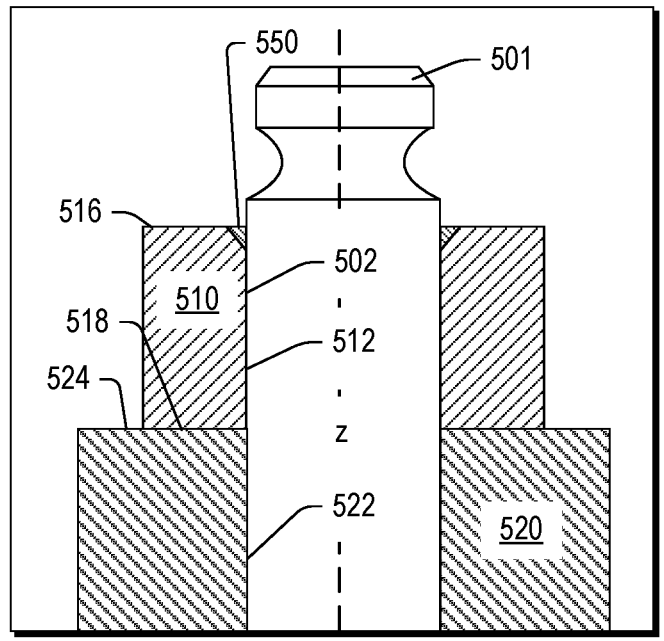
Figure 17:
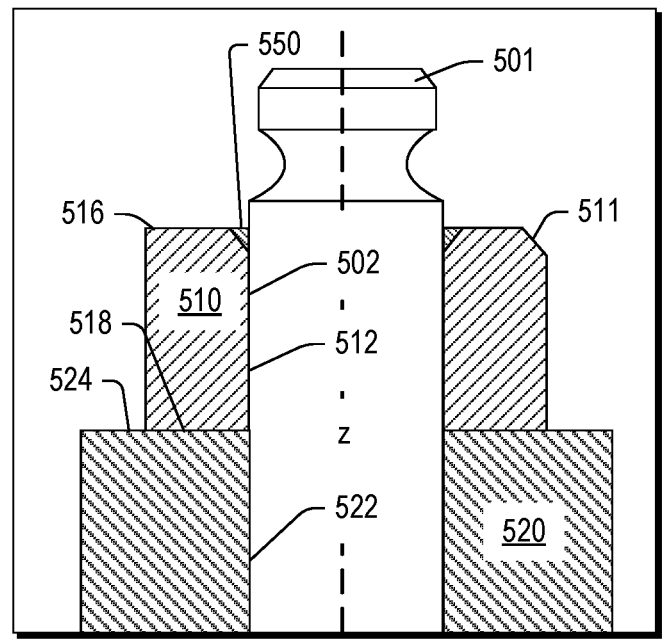

FIG. 17 shows an example of a method 1700 with respect to the assembly 500 of FIG. 5. As shown, the method 1700 includes a provision block 1710 for providing a welded lock collar and shaft (e.g., the lock collar 510 welded to the shaft 501), a measurement block 1720 for measuring unbalance of the assembly 500 (e.g., as to a rotating group thereof), and a removal block 1730 for removing material from one or more components (e.g., the lock collar 510, the nose of the compressor wheel 520, another component, etc.). In such an example, the removal block 1730 may remove material from one or more components at a particular azimuthal angle or angles with respect to a rotational axis of the shaft 501. Such an angle or angles may be output by a balancing machine. As an example, a system that may include one or more of the components of the system 1400 may be utilized for removal material. For example, a laser or lasers may be utilized to remove material from a component or components. As shown in FIG. 17, the lock collar 510 includes a balance cut 511, which represents a portion of the lock collar 510 where material has been removed to thereby improve balance.

Figure 18:
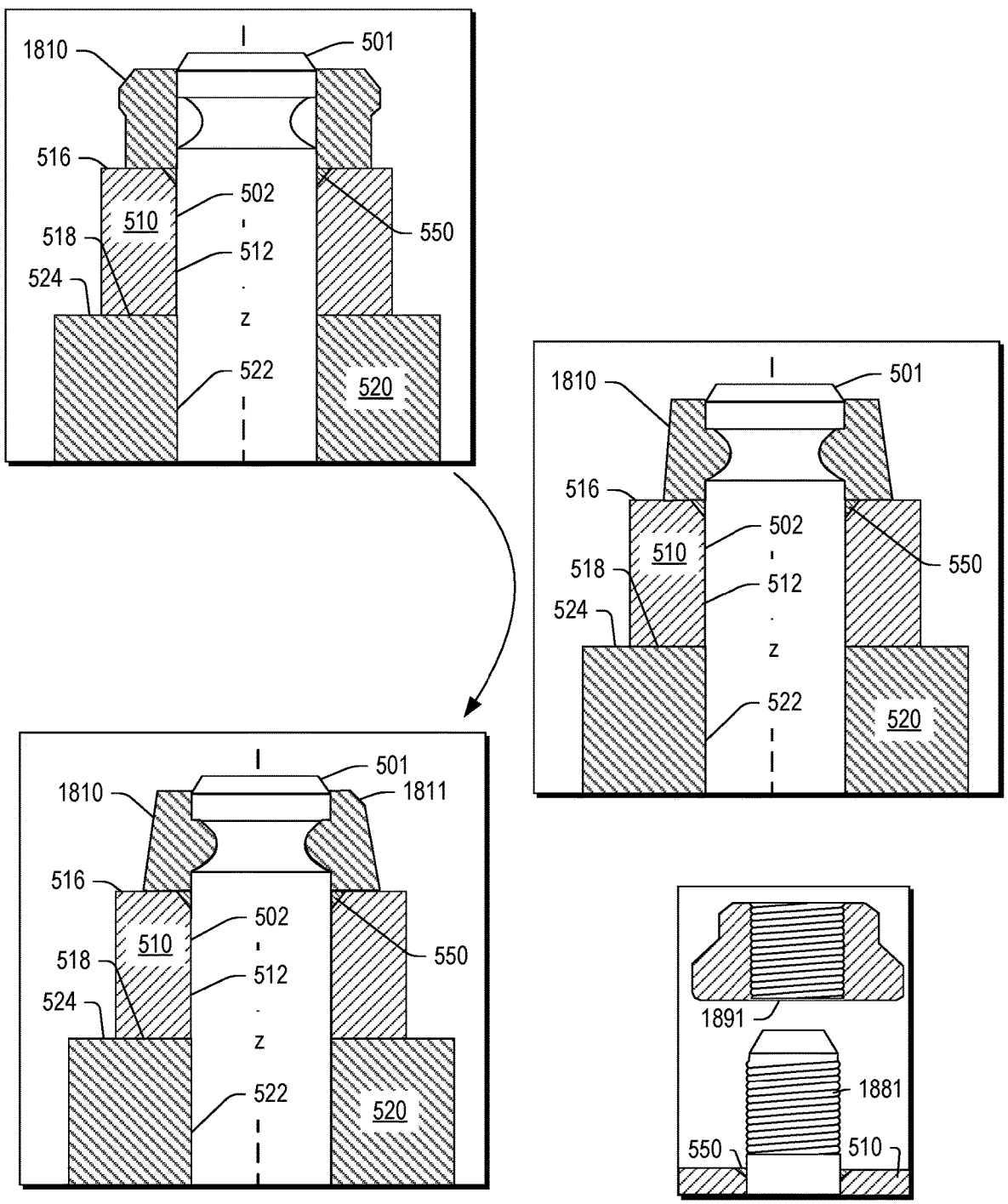
FIG. 18 is a diagram of an example of a method with reference to examples of assemblies.

FIG. 18 shows an example of the assembly 500 with an additional component 1810, which may be fit to a portion of the shaft 501. For example, the component 1810 can include a bore that has a diameter that can receive at least a portion of the shaft 501, which may include a recessed portion. In such an example, the component 1810 may be deformed such that it is secured to the shaft 501. For example, the component 1810 may be deformed through application of force such that a portion of the material of the component 1810 occupies the recess (e.g., or recesses) of the shaft 501. In such an example, the recess may be an annular recess that spans approximately 180 degrees about the rotational axis of the shaft 501. As an example, a shaft may include plurality of recesses, which may or may not span approximately 180 degrees but provide for receipt of material of the component 1810 to thereby secure the component 1810 to the shaft 501.

In the example of FIG. 18, the material of the component 1810 may differ from the material of the lock collar 510. As an example, the material of the component 1810 may be utilized for balancing. For example, FIG. 18 shows an example of a balance cut 1811 where material has been removed from the component 1810.

In the example of FIG. 18, the component 1810 may be secured to the shaft 501 in a manner that covers the weld 550, which may be a single weld or multiple welds (e.g., spot, continuous, etc.). In such an example, the component 1810 may help to protect the weld from exposure to gas and/or other chemicals. In such an example, balancing may optionally be performed without removal of material from the lock collar 510. As an example, where an assembly includes a compressor wheel, a lock collar and another component, one or more of those components may be utilized for purposes of material removal for balancing. As an example, the component 1810 may be made of a material that is easier to cut than a material from which the lock collar 510 is made. For example, the component 1810 may be made of a softer material than the lock collar 510 (e.g., consider material properties characterized by a hardness scale such as the Rockwell hardness scale). As an example, the component 1810, the lock collar 510 and the shaft 501 may include iron. As an example, the component 1810, the lock collar 510 and the shaft 501 may include steel. As an example, the component 1810, the lock collar 510 and the shaft 501 may be made of a common material (e.g., a particular type of steel).

As an example, an assembly can include a swaged collar on a shaft where such a swaged collar can be fit to the shaft in a manner that intends to diminish (e.g., even avoid) torsion and bending of the shaft. As an example, the component 1810 may be a swaged collar, which may optionally be cut (e.g., mechanically, using an energy beam, etc.).

As shown in the example of FIG. 18, the radial dimensions of the component 1810 change. For example, a swage collar can include a radial or cross-sectional profile that changes responsive to force that deforms the collar. As shown in the example of FIG. 18, the component 1810 can include a larger radius over an upper half and a smaller radius over a lower half where deformation can result in a smaller radius over an upper half and a larger radius over a lower half where the lower half includes a lower surface that can be, for example, in contact with the lock collar 510. As an example, a bore diameter of a component such as the component 1810 can change responsive to application of force where the bore diameter becomes smaller over at least one axial portion of the bore.

As an example, the component 1810 in FIG. 18 may be a type of back-up mechanism that provides for retaining the compressor wheel 520 on the shaft 501 in an instance where a weld or welds may weaken as to the lock collar 510 and the shaft 501. In such an example, the component 1810 may be secured in a manner that can carry a load that is carried by the lock collar 510 (e.g., prior to weakening of a weld or welds).

As an example, a component such as a lock nut may be utilized where the shaft 501 includes threads on a portion thereof. For example, consider an inset diagram in FIG. 18 that illustrates a threaded portion 1881 of a shaft, a lock nut 1891 with mating threads and the lock collar 510 with the weld 550. In such an example, the lock nut 1891 may be a type of back-up mechanism that provides for retaining the compressor wheel 520 on the shaft 501 in an instance where a weld or welds may weaken as to the lock collar 510 and the shaft 501. In such an example, a lock nut may be threaded onto the shaft 501 (e.g., where the threaded portion 1881 is present) in a manner that brings a lower surface of the lock nut into contact with the lock collar 510. Such an approach may be achieved with a minimal amount of torque. In such an example, the threads may be self-locking. In such an example, the lock nut may be available for balancing (e.g., material removal). With reference to FIG. 4, the lock nut 410 is shown with respect to a threaded portion of the shaft 401. As an example, such a threaded portion may extend axially past an end of the lock collar 510 such that a lock nut such as the lock nut 410 can be threaded onto the shaft 501 (e.g., where it includes threads) to move the lock nut 410 into contact with the lock collar 510. In such an example, an assembly can be loaded with load "locked-in" via the lock collar 510. In such an example, the lock nut 410, itself, is not exposed to loading forces at the time of installation. However, if the lock collar 510, as a welded lock collar, were to lose contact with the shaft (e.g., via weakening of a weld or welds), the lock nut 410 may then carry the load. In such an example, the lock nut 410 would carry the load without having previously been subjected to the type of torque that the lock nut 410 would experience if it were used to "lock-in" the load at time of assembly (e.g., to secure a compressor wheel to a shaft).

As an example, a method can include loading a rotating assembly of a turbocharger via positioning a lock collar on an end portion of a turbocharger shaft that extends through a through bore of a compressor wheel; applying a pulling force to the end portion of the turbocharger shaft to achieve a desired amount of loading; welding the lock collar to form a welded lock collar fixed to the end portion of the turbocharger shaft; and releasing the pulling force where the welded lock collar maintains the desired amount of loading. In such an example, the desired amount of loading may exceed a force of approximately 1000 N.

As an example, a lock collar can include a cylindrical bore surface and an end portion of a turbocharger shaft can include a cylindrical outer surface. In such an example, portions of the surfaces that axially align can be thread-less. As an example, a shaft may include a threaded portion. For example, such a threaded portion may extend axially away from a turbine wheel end of the shaft toward a free end of the shaft where such a threaded portion may optionally receive a threaded lock nut, which may be a back-up mechanism and/or a balancing mechanism (e.g., via material removal). As an example, a shaft can include one or more recesses over a portion that extends axially away from a turbine wheel end of the shaft toward a free end of the shaft where such a portion (e.g., recessed portion) may optionally receive a swaged collar, which may be a back-up mechanism and/or a balancing mechanism (e.g., via material removal).

As an example, a lock collar can include a thread-less bore that extends an axial length of the lock collar where an end portion of a turbocharger shaft includes a thread-less surface that is at least the axial length of the lock collar.

As an example, a method can include applying a pulling force to an end portion of a turbocharger shaft at least in part via applying a pulling force via a threaded coupling of a tool to the end portion of the turbocharger shaft.

As an example, a method can include welding that includes directing an energy beam at a lock collar to form a weld pool that upon solidification thereof fixes the lock collar as a welded lock collar to an end portion of a turbocharger shaft.

As an example, a method can include welding that forms a weld at an interface between a lock collar and an end portion of a turbocharger shaft. In such an example, the weld may be an annular weld. As an example, a method can include forming one or more welds, which may include one or more continuous and/or one or more spot welds. As an example, a method can include forming two or more welds simultaneously.

As an example, welding can be or include laser welding. As an example, welding can be or include electron beam welding. As an example, one or more types of welding may be utilized to fix a lock collar to a shaft.

As an example, a method can include applying a pulling force to an end portion of a turbocharger shaft to achieve a desired amount of loading where such an approach include contacting an arm and a surface of a nose end of the compressor wheel. In such an example, the arm can be an arm of a tool that may be controllable for purposes of applying a load. As an example, a tool, which may be a unit or an assembly, may include a load cell, which may include circuitry that can output load information to one or more controllers.

As an example, a method can include applying a pulling force to an end portion of a turbocharger shaft to achieve a desired amount of loading via contacting an arm and a surface of a hub of a compressor wheel.

As an example, a method can include applying a pulling force to an end portion of the turbocharger shaft to achieve a desired amount of loading via contacting an arm and a surface of the lock collar as positioned on an end portion of a turbocharger shaft.

As an example, a method can include triggering welding responsive to achieving a desired amount of loading. For example, consider a load cell that can output a signal that can be used to determine an amount of load where once a desired amount of load is achieved, a command is issued to commence welding. For example, consider a system such as the system 1400 of FIG. 14 where one or more controllers may be utilized to perform such a method.

As an example, a method can include securing a component to a portion of a turbocharger shaft that extends axially outwardly from an axial location of a welded collar. In such an example, the component may be a swaged collar or a lock nut.

As an example, a method can include balancing a rotating assembly by removing material from a lock collar, removing material from a compressor wheel or removing material from a compressor wheel without removing material from a lock collar. As an example, where a swaged collar or a lock nut is present in addition to a lock collar, a method may include balancing a rotating assembly by removing material from one or more components, which may include the swaged collar or the lock nut.

As an example, a rotating assembly can include a thrust collar that abuts a compressor wheel at a base end of the compressor wheel, where a turbocharger shaft includes a surface that abuts the thrust collar, and where a desired amount of loading is maintained axially between the locked collar and the surface of the turbocharger shaft.

As an example, a rotating assembly of a turbocharger can include a lock collar welded to an end portion of a turbocharger shaft that extends through a through bore of a compressor wheel where the lock collar maintains a desired amount of loading with respect to the turbocharger shaft and the compressor wheel. In such an example, the rotating assembly may additionally include another component. For example, consider a swaged collar or a lock nut that is outboard from the welded lock collar. In such an example, the swaged collar or the lock nut may be a back-up mechanism and/or a balancing mechanism (e.g., from which material may optionally be removed for balancing the rotating assembly).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A method of loading a rotating assembly of a turbocharger, the method comprising:
    positioning a lock collar on an end portion of a turbocharger shaft that extends through a through bore of a compressor wheel;
    applying a pulling force to the end portion of the turbocharger shaft to achieve a desired amount of loading;
    welding the lock collar to form a welded lock collar fixed to the end portion of the turbocharger shaft; and
    releasing the pulling force wherein the welded lock collar maintains the desired amount of loading.

2. The method of claim 1 wherein the desired amount of loading exceeds a force of approximately 1000 N.

3. The method of claim 1 wherein the lock collar comprises a cylindrical bore surface and wherein the end portion of the turbocharger shaft comprises a cylindrical outer surface.

4. The method of claim 1 wherein the lock collar comprises a thread-less bore that extends an axial length of the lock collar and wherein the end portion of the turbocharger shaft comprises a thread-less surface that is at least the axial length of the lock collar.

5. The method of claim 1 wherein applying a pulling force to the end portion of the turbocharger shaft comprises applying a pulling force via a threaded coupling of a tool to the end portion of the turbocharger shaft.

6. The method of claim 1 wherein the welding comprises directing an energy beam at the lock collar to form a weld pool that upon solidification thereof fixes the lock collar as a welded lock collar to the end portion of the turbocharger shaft.

7. The method of claim 1 wherein the welding forms a weld at an interface between the lock collar and the end portion of the turbocharger shaft.

8. The method of claim 7 wherein the weld comprises an annular weld.

9. The method of claim 1 wherein the welding comprises laser welding.

10. The method of claim 1 wherein the applying a pulling force to the end portion of the turbocharger shaft to achieve a desired amount of loading comprises contacting an arm and a surface of a nose end of the compressor wheel.

11. The method of claim 1 wherein the applying a pulling force to the end portion of the turbocharger shaft to achieve a desired amount of loading comprises contacting an arm and a surface of a hub of the compressor wheel.

12. The method of claim 1 wherein the applying a pulling force to the end portion of the turbocharger shaft to achieve a desired amount of loading comprises contacting an arm and a surface of the lock collar as positioned on an end portion of a turbocharger shaft.

13. The method of claim 1 wherein the desired amount of loading triggers the welding.

14. The method of claim 1 comprising measuring loading.

15. The method of claim 1 comprising securing a component to a portion of the turbocharger shaft that extends axially outwardly from the axial location of the welded collar.

16. The method of claim 15 wherein the component comprises a swaged collar.

17. The method of claim 15 wherein the component comprises a lock nut.

18. The method of claim 1 comprising balancing the rotating assembly by removing material from the lock collar, removing material from the compressor wheel or removing material from the compressor wheel without removing material from the lock collar.

19. The method of claim 1 comprising a thrust collar that abuts the compressor wheel at a base end of the compressor wheel, wherein the turbocharger shaft comprises a surface that abuts the thrust collar, and wherein the desired amount of loading is maintained axially between the locked collar and the surface of the turbocharger shaft.

* * * * *